United States Patent [19]

Peters

[11] Patent Number: 5,577,190

[45] Date of Patent: * Nov. 19, 1996

[54] MEDIA EDITING SYSTEM WITH ADJUSTABLE SOURCE MATERIAL COMPRESSION

[75] Inventor: Eric C. Peters, Carlisle, Mass.

[73] Assignee: Avid Technology, Inc., Tewksbury, Mass.

[ * ] Notice: The term of this patent shall not extend beyond the expiration date of Pat. No. 5,355,450.

[21] Appl. No.: 270,442

[22] Filed: Jul. 5, 1994

Related U.S. Application Data

[63] Continuation of Ser. No. 866,829, Apr. 10, 1992, Pat. No. 5,355,450, and a continuation-in-part of Ser. No. 807,117, Dec. 13, 1991, and a continuation-in-part of Ser. No. 807, 269, Dec. 13, 1991.

[51] Int. Cl.$^6$ .................................................. G06F 15/00
[52] U.S. Cl. ............................................ 395/501; 395/507
[58] Field of Search ..................................... 395/159, 161, 395/600, 162–166; 360/14.1, 14.2, 14.3; 358/209, 210

[56] References Cited

U.S. PATENT DOCUMENTS

| Re. 34,824 | 1/1995 | Morrison et al. | 348/419 |
|---|---|---|---|
| 3,813,485 | 5/1974 | Aros | 178/6.8 |
| 4,191,971 | 3/1980 | Dishert et al. | 358/210 |
| 4,302,775 | 11/1981 | Widergren et al. | 358/136 |
| 4,394,774 | 7/1983 | Widergren et al. | 382/56 |

(List continued on next page.)

FOREIGN PATENT DOCUMENTS

| 0207774 | 1/1987 | European Pat. Off. . |
|---|---|---|
| 0296608 | 12/1988 | European Pat. Off. . |
| 0310175 | 4/1989 | European Pat. Off. . |
| 0323362A1 | 7/1989 | European Pat. Off. . |

(List continued on next page.)

OTHER PUBLICATIONS

"100 Mbit/s HDTV Transmission Using a High Efficiency Codec," Y. Yashima and K. Sawada, Signal Processing of HDTV, II, L. Chiariglione (ed.), Elsevier Science Publishers B.V., 1990, pp. 579–586.

"A Chip Set Core for Image Compression," A. Artieri and O. Colavin, IEEE Transactions on Consumer Electronics, vol. 36, No. 3, Aug. 1990, pp. 395–402.

"A Complete Single–Chip Implementation of the JPEG Image Compression Standard," M. Bolton et al., Proc. of the CICC, pp. 12.2.1–12.2.4, May 1991.

(List continued on next page.)

*Primary Examiner*—Mark R. Powell
*Assistant Examiner*—U. Chauhan
*Attorney, Agent, or Firm*—Wolf, Greenfield & Sacks, P.C.

[57] ABSTRACT

A media editing system for editing source material comprising digitizing apparatus for receiving and digitizing video and audio source material, the video source material including a sequence of images, each spanning both the horizontal and vertical display axes of the video source material. The editing system also includes computing apparatus including compression apparatus responsive to the digitizing apparatus. The compression apparatus compresses the images from the video source material. The computing apparatus determines if at least one of the compressed images occupies more than a target amount of storage and provides an indication if the at least one of the compressed images does occupy more than the target amount of storage. The compression apparatus is responsive to this indication to adjust its level of compression. The computing apparatus is also for manipulating the stored source material. The editing system further comprises a mass storage responsive to the computing apparatus to receive the compressed video source material and the audio source material, and output apparatus communicating with the computing apparatus to display the manipulated source material. In another general aspect, a data buffer that compensates for differences in data rates, between a storage device and an image compression processor, and a method and apparatus for the real time indexing of frames in a video data sequence.

19 Claims, 10 Drawing Sheets

U.S. PATENT DOCUMENTS

| | | | |
|---|---|---|---|
| 4,574,351 | 3/1986 | Dang et al. | 364/200 |
| 4,599,689 | 7/1986 | Berman | 364/200 |
| 4,672,441 | 6/1987 | Hoelzlwimmer et al. | 358/135 |
| 4,704,628 | 11/1987 | Chen et al. | 358/136 |
| 4,704,730 | 11/1987 | Turner et al. | 381/36 |
| 4,707,738 | 11/1987 | Ferre et al. | 358/135 |
| 4,729,020 | 3/1988 | Schaphorst et al. | 358/133 |
| 4,734,767 | 3/1988 | Kaneko et al. | 358/133 |
| 4,785,349 | 11/1988 | Keith et al. | 358/136 |
| 4,797,742 | 1/1989 | Sugiyama et al. | 358/141 |
| 4,809,067 | 2/1989 | Kikuchi et al. | 358/135 |
| 4,814,871 | 3/1989 | Keesen et al. | 358/133 |
| 4,839,724 | 6/1989 | Keesen et al. | 358/138 |
| 4,890,161 | 12/1989 | Kondo | 358/135 |
| 4,897,855 | 1/1990 | Acampora | 375/27 |
| 4,937,685 | 6/1990 | Barker et al. | 360/14.1 |
| 4,951,139 | 8/1990 | Hamilton et al. | 358/135 |
| 4,962,463 | 10/1990 | Crossno et al. | 364/518 |
| 4,982,282 | 1/1991 | Saito et al. | 358/133 |
| 4,985,766 | 1/1991 | Morrison et al. | 358/133 |
| 4,988,982 | 1/1991 | Rayner et al. | 340/706 |
| 5,021,891 | 6/1991 | Lee | 358/432 |
| 5,038,209 | 8/1991 | Hang | 358/136 |
| 5,046,119 | 9/1991 | Hoffert et al. | 382/56 |
| 5,047,853 | 9/1991 | Hoffert et al. | 358/133 |
| 5,050,230 | 9/1991 | Jones et al. | 382/56 |
| 5,061,924 | 10/1991 | Mailhot | 341/76 |
| 5,068,745 | 11/1991 | Shimura | 358/403 |
| 5,073,821 | 12/1991 | Juri | 358/135 |
| 5,107,345 | 4/1992 | Lee | 358/136 |
| 5,122,875 | 6/1992 | Raychaudhuri et al. | 358/133 |
| 5,130,797 | 7/1992 | Murakami et al. | 358/133 |
| 5,138,459 | 8/1992 | Roberts et al. | 358/209 |
| 5,146,564 | 9/1992 | Evans et al. | 395/250 |
| 5,164,980 | 11/1992 | Bush et al. | 379/53 |
| 5,168,374 | 12/1992 | Morimoto | 358/426 |
| 5,170,264 | 12/1992 | Saito et al. | 358/433 |
| 5,179,651 | 1/1993 | Taaffe et al. | 395/154 |
| 5,191,548 | 3/1993 | Balkanski et al. | 364/725 |
| 5,191,645 | 3/1993 | Carlucci et al. | 395/159 |
| 5,193,002 | 3/1993 | Guichard et al. | 358/133 |
| 5,196,933 | 3/1993 | Henot | 358/136 |
| 5,202,760 | 4/1993 | Tourtier et al. | 358/141 |
| 5,228,028 | 7/1993 | Cucchi et al. | 370/94.1 |
| 5,228,126 | 7/1993 | Marianetti, II | 395/162 |
| 5,237,675 | 8/1993 | Hannon, Jr. | 395/425 |
| 5,253,078 | 10/1993 | Balkanski | 358/426 |
| 5,270,832 | 12/1993 | Balkanski et al. | 358/432 |
| 5,274,443 | 12/1993 | Dachiku et al. | 358/136 |
| 5,287,420 | 2/1994 | Barrett | 382/233 |
| 5,301,242 | 4/1994 | Gonzales et al. | 382/56 |
| 5,309,528 | 5/1994 | Rosen et al. | 382/58 |
| 5,329,616 | 7/1994 | Silverbrook | 395/164 |
| 5,341,318 | 8/1994 | Balkanski et al. | 364/725 |
| 5,369,505 | 11/1994 | Wantanabe et al. | 358/444 |
| 5,379,356 | 1/1995 | Purcell et al. | 382/56 |
| 5,388,197 | 2/1995 | Rayner | 395/159 |
| 5,414,796 | 5/1995 | Jacobs et al. | 395/2.3 |

FOREIGN PATENT DOCUMENTS

| | | | |
|---|---|---|---|
| 0347330A1 | 12/1989 | European Pat. Off. | |
| 0469835A2 | 5/1992 | European Pat. Off. | G06F 15/64 |
| 2597282 | 10/1987 | France | |
| 3940554A1 | 6/1990 | Germany | |
| 2104180 | 4/1990 | Japan | H04N 7/133 |
| WO91/14339 | 9/1991 | WIPO | |
| WO92/22166 | 12/1992 | WIPO | H04N 1/415 |

OTHER PUBLICATIONS

"A JPEG Still Picture Compression LSI," Tsugio Noda et al., 1991 Symposium on VLSI Circuits, pp. 33–34.

"Adaptive Transform Coding of HDTV Pictures," Chantelou et al., Signal Processing of HDTV, Proc. of the Second Int. Workshop on Signal Processing of HDTV, L'Aquila, Feb. 29, 1988–Mar. 2, 1988, pp. 231–238.

"An Encoder/Decoder Chip Set for the MPEG Video Standard," Ichiro Tamitani et al., IEEE International Conference on Acoustics, Speech and Signal Processing, ICASSP-92, vol. 5, Mar. 1992, pp. 661–664.

"An Experimental Digital VCR With 40 mm Drum, Single Actuator and DCT–Based Bit–Rate Reduction," S. M. C. Borgers et al., IEEE Trans. on Consumer Electronics, vol. 34, No. 3, 1988.

"C–Cube CL550™ Compression Monitor User's Manual," Version 3.1, A Compression/Decompression Utility for Use With the C–Cube CL550 Development Board, C–Cube Microsystems, Aug. 1991, pp. 1–13.

"C–Cube CL550™ A Development Board for NuBus™," C–Cube Microsystems, Oct. 1990, Product Literature.

"C–Cube CL550 JPEG Image Compression Processor", C–Cube MicroSystems, Preliminary Data Book, Aug. 1991, pp. 1–93.

"C–Cube Microsystems Compression Workshop," C–Cube Microsystems, 1990.

"CD–I Full–Motion Video Encoding on a Parallel Computer," F. Sijstermans and J. van der Meer, Communications of the ACM, vol. 34, No. 4, Apr. 1991, pp. 82–91.

"CenterStage Application Environment," Advertising material, Fluent Machines Inc.

"CL550 Engineering Samples (ES2 Revision) Bug List," C–Cube Microsystems, Product Marketing, Feb., 1991.

"CL550 Errata Information," C–Cube Product Marketing Literature, Nov. 1990.

"CL550 Reference Streams," C–Cube MicroSystems Technical Note.

"CL550A JPEG Image Compression Processor", C–Cube MicroSystems, Preliminary Data Book, Feb. 1990, pp. 1–36.

"Coding of Color Television Signals Using a Modified M–Transform for 34 Mbit/s–Transmission", Keesen et al., Frequenz, vol. 38, No. 10, Oct. 1984, with translation, pp. 238–243.

Leonard, M., "IC Executes Still–Picture Compression Algorithms," Electronic Design, May 23, 1991, pp. 49–53.

Guglielmo, Connie, "New Video Will bring IBM–endorsed DVI Video Tech. to Mac users," MacWeek, Nov. 13, 1990, v4 n39 p. 5.

Wallace, Gregory K., "The JPEG still Picture Compression Standard," Communications of the ACM, Apr. 1991, v34 n4 p.30(15).

News Release entitled "Media 100™—Industry's First Online, Nonlinear Video Production System Introduced by Data Translation's Multimedia Group" dated Jan. 11, 1992.

"Multimedia Group Strategy and Media 100™ Backgrounder" dated Feb. 1992.

"Announcing a totally new concept in the field of video post production" allegedly distributed Jan. 1992.

U.S. Serial No. 08/048,458.

U.S. Serial No. 08/048,782.

C. Birkmaier, "Video Compression, Weighing the advantages of scalable digital video", Videography, Jun. 1991, pp. 38–50.

"Combined Source Channel Coding in Adaptive Transform Coding Systems for Images," Goetze, M., Proceedings of the IEEE International Conference on Communications, May 1984, vol. 1, pp. 511–515.

"Compression Monitor Software (Version 2.0) User's Manual," C–Cube Microsystems, pp. 1–11.

"Compressor/DEcompressor (CODEC)," Advertising Literature, Fluent Machines Inc.

"DigiCipher™—All Digital, Channel Compatible, HDTV Broadcast System," W. Paik, IEEE Trans. on Broadcasting, vol. 36, No. 4, Dec. 1990.

"Digital Pictures, Representation and Compression," A. N. Netravali and B. G. Haskell, Plenum Press, New York, Jun., 1989, pp. 301–551.

"Feature Sets for Interactive Images," A. Lippman, Communications of the ACM, vol. 34, No. 4, Apr. 1991, pp. 93–102.

"Fluent Multimedia: Extending the Capabilities of DVI," Advertising material, Fluent Machines Inc.

"FM/1 Multimedia Development System," Advertising material, Fluent Machines Inc.

"IC801 Single–Chip Px64 Codec For Video Phones," Preliminary Information, InfoChip Systems Incorporated, Mar. 1992, pp. 1–12.

"Image Coding by Adaptive Block Quantization," Tasto et al., IEEE Transactions on Communications Technology, vol. COM–19, No. 6, Dec. 1971, pp. 957–972.

"Interframe Adaptive Data Compression Techniques for Images," J. R. Jain & A. K. Jain, Signal and Image Processing Lab., Dept. of Electrical and Computer Eng., Univ. of California, Davis, Aug. 1979, pp. 1–177.

"L64735 Discrete Cosine Transform Processor," LSI Logic Corporation, Jan. 1991.

"L64745 JPEG Coder," LSI Logic Corporation, Jan. 14, 1991, pp. 1–14.

"New Video will bring IBM–endorsed DVI video technology to Mac users," C. Guglielmo, MacWEEK, vol. 4 No.39, p. 5, Nov. 13, 1990.

"NeXTstep: Putting JPEG to Multiple Uses," G. Cockroft and L. Hourvitz, Communications of the ACM Apr. 1991, vol. 34, No. 4, pp. 45 and 116.

"OBRAZ 1/ Caractéristiques Générales," Advertising material, MACSYS (with translation).

"OBRAZ Explication succincte," Advertising material, MACSYS (with translation).

"Overview of the px64 kbit/s Video Coding Standard," M. Liou, Communications of the ACM, vol. 34, No. 4, Apr. 1991, pp. 60–63.

Proceedings of the 1983 International Zurich Seminar on Digital Communications, Lohscheller, H., Mar. 1984, pp. 25–31.

Technical Notes Mar. 1990, C–Cube Microsystems, 1990.

"The C–Cube CL550 JPEG Image Compression Processor," S. C. Purcell, IEEE Computer Society International Conference, 1991, pp. 318–323.

"The JPEG Still Picture Compression Standard," Wallace, G. K., Communications of the ACM, vol. 34, No. 4, pp. 30–44, Apr. 1991.

"Toward an Open Environment for Digital Video," M. Liebhold and E. M. Hoffert, Communications of the ACM, vol. 34, No. 4, Apr. 1991, pp. 104–112.

"Video Compression Chip Set," LSI Logic Corporation, pp. 1–16.

"Video Compression Chipset Attacks High Multimedia Price Tags," LSI Logic Corporation.

"Monolithic Circuits Expedite Desktop Video," D. Pryce, Electrical Design News, vol. 36, No. 22, Oct. 1991, Newton, MA, pp. 67, 69, 74 and 76.

MEDIA EDITING SYSTEM WITH ADJUSTABLE SOURCE MATERIAL COMPRESSION

RELATED APPLICATIONS

This application is a continuation-in-part of U.S. patent application Ser. No. 07/807,269 entitled "Buffer and Frame Indexing", now U.S. Pat. No. 5,513,375 U.S. patent application Ser. No. 07/807,117 entitled "Quantization Table Adjustment", both to Eric C. Peters and filed on Dec. 13, 1991, and a continuation of U.S. patent application Ser. No. 07/866,829 entitled "Media Composer With Adjustable Source Material Compression", filed on Apr. 10, 1992, now U.S. Pat. No. 5,355,450.

BACKGROUND OF THE INVENTION

This invention relates to hardware designs coupled with software-based algorithms for capture, compression, decompression, and playback of digital image sequences, particularly in an editing environment.

Video and audio source material editing systems employing digital techniques have been introduced over the last several years. One example is the Avid/1 Media Composer from Avid Technology, Inc., of Burlington, Mass. This media composer receives, digitizes, stores and edits video and audio source material. After the source material is digitized and stored, a computer such as an Apple Macintosh based computer manipulates the stored digital material and a pair of CRT monitors are used for displaying manipulated material and control information to allow editing to be performed. Later versions of the media composer included compression techniques to permit the display of full motion video from the digitized source material. Compression was achieved using a JPEG chip from C-Cube of Milpitas, Calif. That data compression is described more fully below. Although previous media composers could achieve full motion video from digitized sources, the compression degraded image quality below desirable levels. Further, the media composer lacked features which enhance the editing process.

The idea of taking motion video, digitizing it, compressing the digital datastream, and storing it on some kind of media for later playback is not new. RCA's Sarnoff labs began working on this in the early days of the video disk, seeking to create a digital rather than an analog approach. This technology has since become known as Digital Video Interactive (DVI).

Another group, led by Phillips in Europe, has also worked on a digital motion video approach for a product they call CDI (Compact Disk Interactive). Both DVI and CDI seek to store motion video and sound on CD-ROM disks for playback in low cost players. In the case of DVI, the compression is done in batch mode, and takes a long time, but the playback hardware is low cost. CDI is less specific about the compression approach, and mainly provides a format for the data to be stored on the disk.

A few years ago, a standards-making body known as CCITT, based in France, working in conjunction with ISO, the International Standards Organization, created a working group to focus on image compression. This group, called the Joint Photographic Experts Group (JPEG) met for many years to determine the most effective way to compress digital images. They evaluated a wide range of compression schemes, including vector quantization (the technique used by DVI) and DCT (Discrete Cosine Transform). After exhaustive qualitative tests and careful study, the JPEG group picked the DCT approach, and also defined in detail the various ways this approach could be used for image compression. The group published a proposed ISO standard that is generally referred to as the JPEG standard. This standard is now in its final form, and is awaiting ratification by ISO, which is expected.

The JPEG standard has wide implications for image capture and storage, image transmission, and image playback. A color photograph can be compressed by 10 to 1 with virtually no visible loss of quality. Compression of 30 to 1 can be achieved with loss that is so minimal that most people cannot see the difference. Compression factors of 100 to 1 and more can be achieved while maintaining image quality acceptable for a wide range of purposes.

The creation of the JPEG standard has spurred a variety of important hardware developments. The DCT algorithm used by the JPEG standard is extremely complex. It requires converting an image from the spatial domain to the frequency domain, the quantization of the various frequency components, followed by Huffman coding of the resulting components. The conversion from spatial to frequency domain, the quantization, and the Huffman coding are all computationally intensive. Hardware vendors have responded by building specialized integrated circuits to implement the JPEG algorithm.

One vendor, C-Cube of San Jose, Calif., has created a JPEG chip (the CL550B) that not only implements the JPEG standard in hardware, but can process an image with a resolution of, for example, 720×488 pixels (CCIRR 601 video standard) in just 1/30th of a second. This means that the JPEG algorithm can be applied to a digitized video sequence, and the resulting compressed data can be stored for later playback. The same chip can be used to compress or decompress images or image sequences. The availability of this JPEG chip has spurred computer vendors and system integrators to design new products that incorporate the JPEG chip for motion video. However, the implementation of the chip in a hardware and software environment capable of processing images with a resolution of 640×480 pixels or greater at a rate of 30 frames per second in an editing environment introduces multiple problems.

For high quality images, a data size of 15–40 Kbytes per frame is needed for images at 720×488 resolution. This means that 30 frames per second video will have a data rate of 450 to 1200 Kbytes per second. For data coming from a disk storage device, this is a high data rate, requiring careful attention to insure a working system.

The most common approach in prior systems for sending data from a disk to a compression processor is to copy the data from disk into the memory of the host computer, and then to send the data to the compression processor. In this method, the computer memory acts as a buffer against the different data rates of the compression processor and the disk. This scheme has two drawbacks. First, the data is moved twice, once from the disk to the host memory, and another time from the host memory to the compression processor. For a data rate of 1200 Kbytes per second, this can seriously tax the host computer, allowing it to do little else but the data copying. Furthermore, the Macintosh computer, for example, cannot read data from the disk and copy data to the compression processor at the same time. The present invention provides a compressed data buffer specifically designed so that data can be sent directly from the disk to the With the JPEG algorithm, as with many compression algorithms, the amount of data that results from compressing an image depends on the image itself. An image of a lone seagull against a blue sky will take much less data than a cityscape of brick buildings with lots of detail. Therefore, it becomes difficult to know where a frame starts within a data file that contains a sequence of frames, such as a digitized and compressed sequence of video. This creates particular problems in the playback from many files based on edit decisions. With fixed size compression approaches, one can simply index directly into the file by multiplying the frame number by the frame size, which results in the offset needed to start reading the desired frame. When the frame size varies, this simple multiplication approach no longer works. One needs to have an index that stores the offset for each frame. Creating this index can be time consuming. The present invention provides an efficient indexing method.

It is often desirable to vary the quality of an image during compression in order to optimize the degree of data compression. For example, during some portions of a sequence, detail may not be important, and quality can be sacrificed by compressing the data to a greater degree. Other portions may require greater quality, and hence this greater degree of compression may be unsuitable. In prior implementations of the JPEG algorithm, quality is adjusted by scaling the elements of a quantization table (discussed in detail hereinbelow). If these elements are scaled during compression, they must be correspondingly m-scaled during decompression in order to obtain a suitable image. This re-scaling is cumbersome to implement and can cause delays during playback. According to one aspect, the present invention is a method that allows for quality changes during compression to enable optimum data compression for all portions of a sequence, while allowing playback with a single quantization table.

SUMMARY OF THE INVENTION

The media composer according to the invention for editing source material includes apparatus for receiving, digitizing, storing and editing video and audio source material. Computing apparatus manipulates the stored source material and output apparatus communicates with the computing apparatus for displaying the manipulated material and control information. The computing apparatus includes JPEG compression apparatus and is programmed so that multiple JPEG resolutions can be displayed, recorded and played back.

In another aspect of the invention, the computing apparatus is programmed to provide motion effects in the displayed material and is further programmed to provide a dial whose rotation rate corresponds to a selected motion effect rate. Motion effects include forward and reverse variable speed effects, fit-to-fill capability, and strobe motion. The improved media composer of the invention enables a variety of wipes to be effected, zoom to full screen capability, pitch change audio scrub, graphics positioning and image capture instrumentation. The system also enables sync point editing and slip sync. The system also provides for a novel mechanical user interface including a track ball and speed control integrated into a single unit. Importantly, the system also supports a media consolidation process to free up disk space.

The data buffer of the invention compensates for the data rate differences between a storage device and the data compression processor of a digital image compression and playback unit. The data buffer interfaces to a host central processing unit, a storage device, a DMA address register, and a DMA limit register, and is mapped into the address space of the host computer bus. The data sequence is unloaded from the storage device into the data buffer, which is twice mapped into the address space of the host computer.

In a further aspect, the invention relates to an apparatus and method for adjusting the post decompression quality of a compressed image. The image quality adjustment is performed by constructing a quantization table that specifies the high frequency image components to be filtered, and by subsequently filtering out those components specified by the table.

DESCRIPTION OF THE PREFERRED EMBODIMENT

Figure 1:
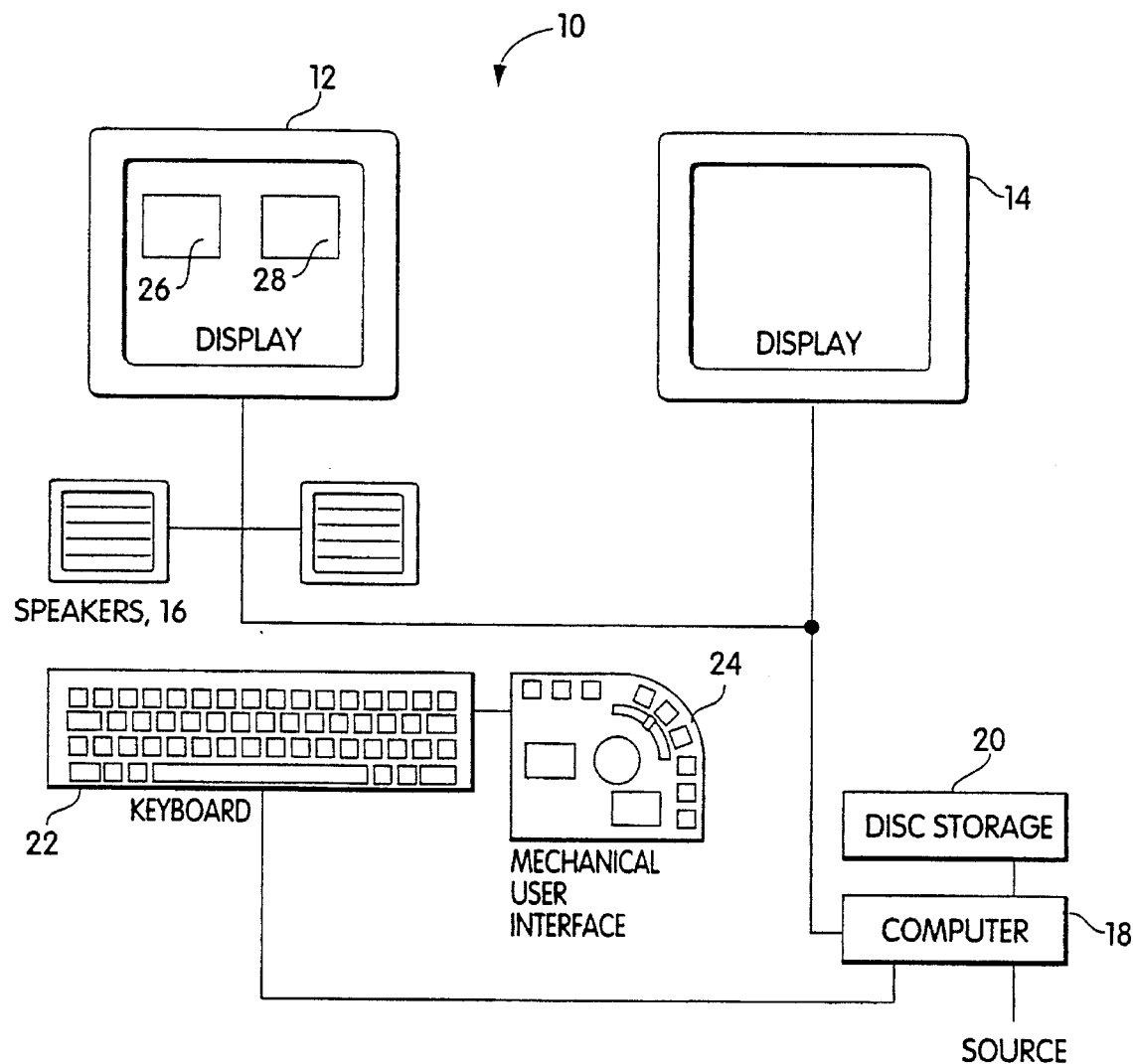
FIG. 1 is a schematic diagram of the media composer system.

With reference to FIG. 1 the media composer system 10 includes a pair of CRT displays 12 and 14 and an audio output device 16 which may include two speakers. The video displays 12 and 14 and the audio transducer 16 are controlled by a computer 18. It is preferred that the computer 18 be a Macintosh from Apple Computer Corporation designated as $II_x$, $II_{ci}$, $II_{fx}$ or Quadra 900. Disk storage apparatus 20 communicates with the computer 18. Disk storage 20 includes one to seven disks for media storage. The disks may be optical or magnetic. The system 10 is controlled by a keyboard 22 and a mechanical user interface 24 to be described in more detail herein.

In operation, video and audio source material is received by the system 10, digitized and stored in the disk storage device 20. The computer 18 is programmed so that the digitized source material may be edited and displayed on one of the video display devices such as the CRT display 12. Typically digitized source material would be displayed at a location 26 and edited material at a location 28 on the display 12.

Figure 2A:
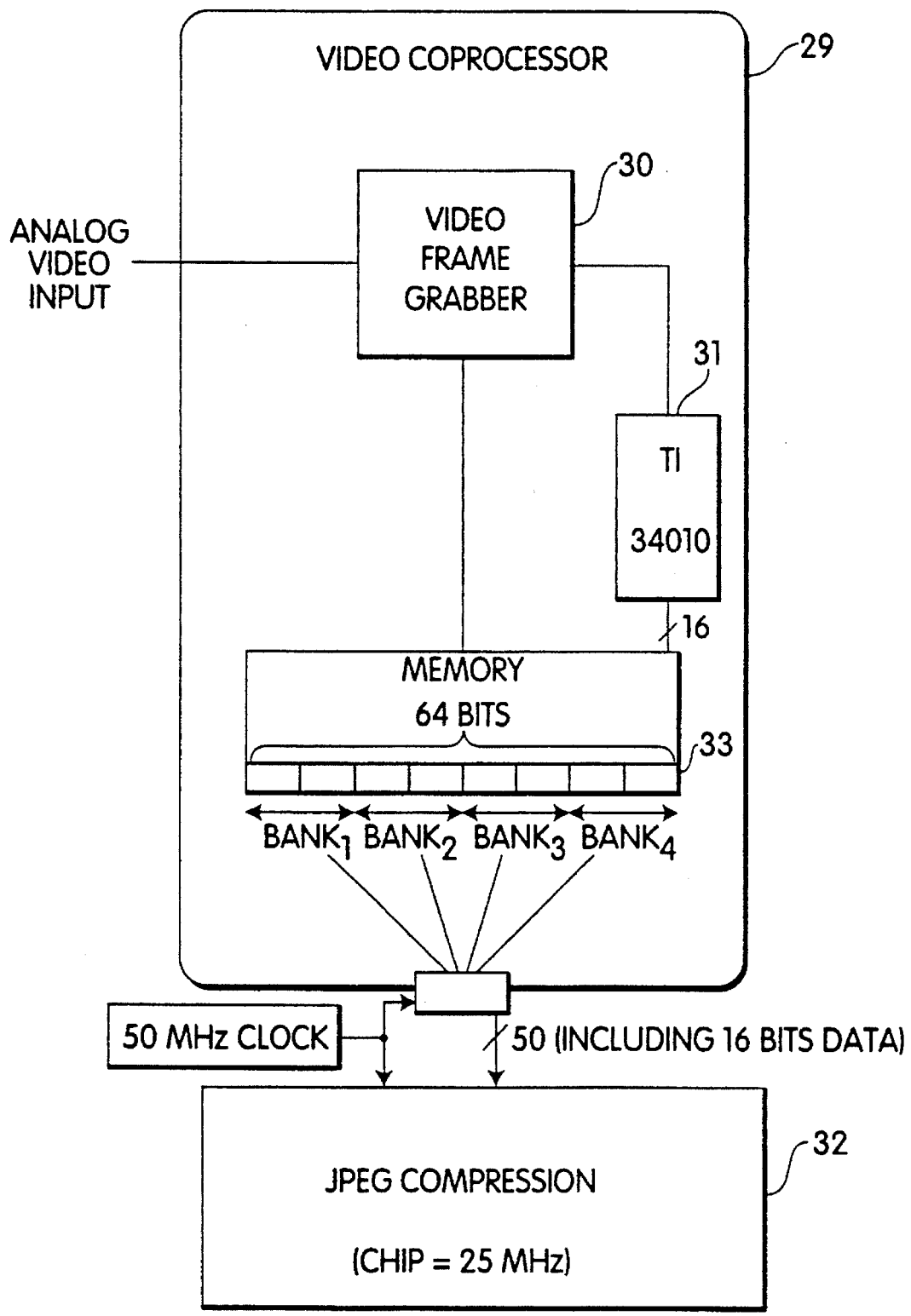
FIG. 2a is a prior art video compression configuration.

As will be appreciated by those skilled in the art, reproducing full motion, 30 frames per second color video from a digital source is a daunting task. FIG. 2a illustrates a prior art system for providing digitization and compression of video images. This system includes a video coprocessor 29, such as the NuVista board made by TrueVision of Indianapolis, Ind. Many other commercially available boards may also be used. A suitable video coprocessor includes a video frame grabber 30 which converts analog video information into digital information, representing each pixel of a frame with a predetermined number of bits, in this case 16-bits. The video coprocessor 29 has a memory 33 which is configured using a coprocessor 31, such as the TI34010 made by Texas Instruments, to provide an output data path to feed JPEG circuitry, such as is available as chip CL550B from C-Cube of Milpitas, Calif. Such configuration can be performed using techniques known in the art. In the system of FIG. 2a, the output data path is 64 bits, divided into four banks of 16 bits. Two significant limitations exist in this situation. First the connection path between a video coprocessor 30 and JPEG compression circuitry 32 was a 50-wire design allowing only 16 bits to pass at one time (16 wires for data; 16 for control of data; others for synchronizing and system control). Second, the JPEG circuitry 32 (and the 16-bit connection) was driven by a 50 MHZ clock which governed its speed to match adequately the 16-bit per cycle flow. The combination of these limitations resulted in an inability to process 640×480×24 (or 32) bit images at 60 fields per second. Typically users of the JPEG chip ($c^3$ CL550B chip) dealt with this by either shrinking the size of the image, reducing the bits per pixel information, or slowing the fields per second rate. All of this results in lower quality video.

Figure 2B:
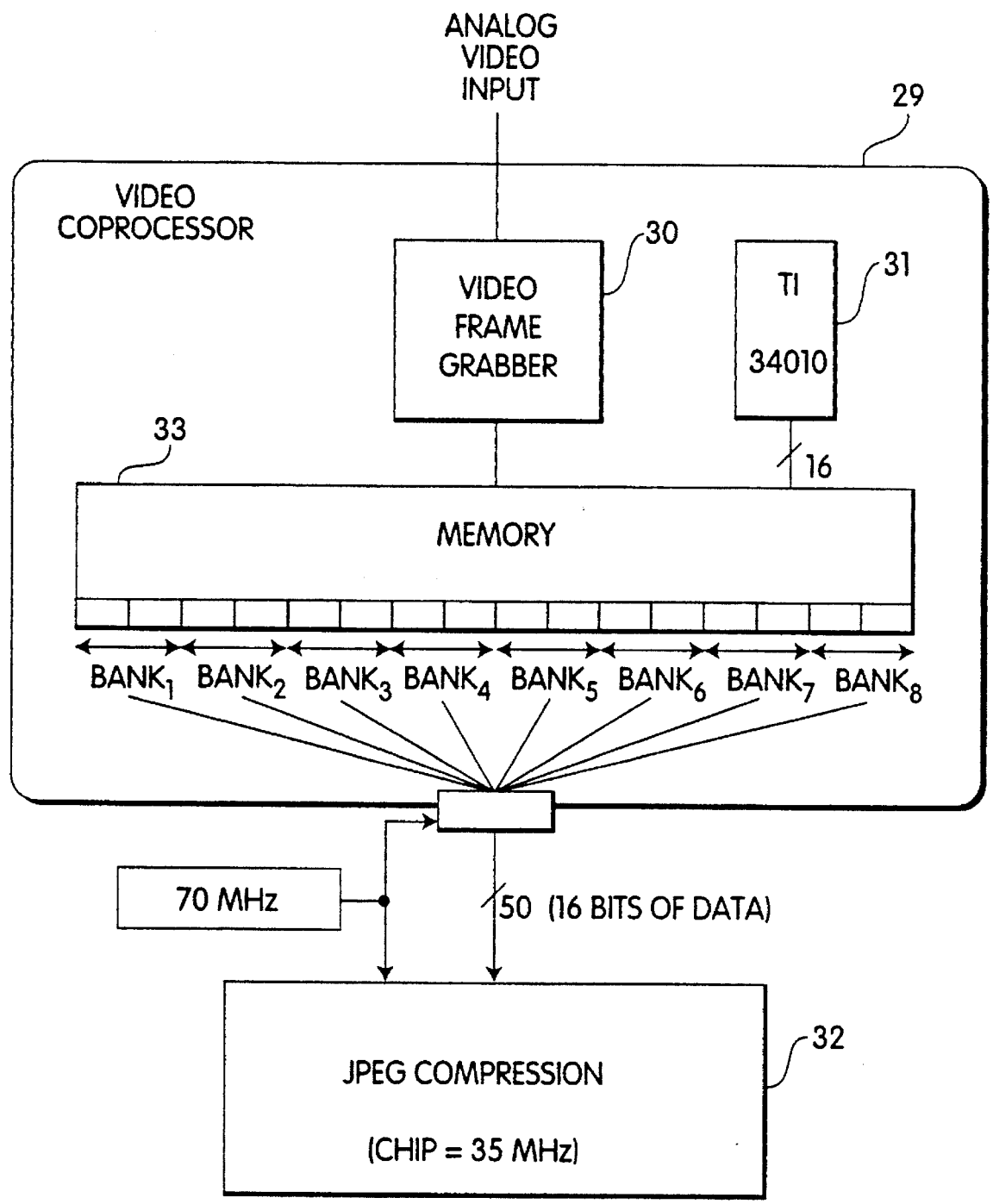
FIG. 2b is the video compression configuration according to the present invention.

FIG. 2b illustrates an improvement over the prior art. Similar components are used for the video coprocessor 29 and JPEG compression circuitry 32. The memory 33 of the video coprocessor 29, however, is configured to provide a 128-bit data path, wherein each pixel is represented by 24-bits. The connection between the coprocessor 29 and the JPEG compression circuitry is run at 70 MHZ. The JPEG circuitry is programmed using known techniques to indicate that 24-bits of input data is used to represent a pixel. The net effect of these improvements is that the JPEG chip is run faster and receives more data, allowing compression of 60 frames per second of 640×480×24 (32) images.

The use of a 24-bit word for each pixel may increase compressed frame size depending on the content of a particular frame. A JPEG chip is configured for compression by providing two 8×8 quantization tables, which are well known in the art. The values are placed into these tables according to frequency. A "Q factor," a composite number which multiplies values in the tables, may be used to designate and scale values in this table. A high Q factor provides increased compression typically at the expense of resolution. A low Q factor improves resolution but typically increases compressed frame size. With most systems, if the Q factor is too low, and the compressed frame size is too high, the JPEG compression chip cannot compress incoming data at an adequate speed. Typically, when this happens, the user is notified, compression stops and a higher Q factor must be selected.

In an embodiment of the present invention, the compressed frame size is monitored in a manner to be described below. When it is determined that the compressed frame size is too large, the Q factor may be increased, or the tables adjusted, automatically. Conversely, if the compressed frame size is small, the Q factor may be decreased, or the tables changed, to increase resolution. The decrease or increase of the Q factor may be performed in a binary, step-wise or other suitable manner. Changing the Q factor changes all values in the table, and requires, at playback time, that the same table be used. As an alternative to changing the Q factor, the values in the table can be decreased for the highest frequencies first, and eventually for lower frequencies, depending on the desired increase or decrease in compression. For this purpose, a table may be maintained to relate a percentage of disparity between actual and desired compression to a number of values in the table to be decreased. If, for example, an actual compression of 22K bytes/frame is achieved when 20K bytes/frame was desired, a disparity of 10% is obtained. From this table, the number of frequencies to be decreased can be determined. The change can be made in a manner known to those of skill in this art. This dynamic adjustment, or roll-off, is not limited to use with systems representing pixels with 24-bit words. It may be used with other systems, such as the system of FIG. 2a.

The monitoring of the compression frame size will now be described. For this purpose, the coprocessor 31 is programmed, using well-known techniques, so that, at the end of each frame received, eight black lines are provided to the JPEG compression circuit. It then issues an interrupt signal, which is received by the host computer. By the time the host computer receives the interrupt signal, all data from the compressed frame is compressed and the only data

| | | | | Hardware Matrix (PRELIMINARY) | | | | | |
|---|---|---|---|---|---|---|---|---|---|
| Res. | Depth | Audio | Max K/f | CPU | JPEG | Audio HW | Disks | Atto | Comments |
| | | | | IIx | JPEG I | AudioMedia | Panasonic Opticals | Without | |
| | | | | IIci | JPEG II | SA-4 & VSD or Pro I/O | 600 MB | With | |
| | | | | IIfx Quadra 900 | JPEG III | | 1 GB 1.5 GB 5400 RPM | | |
| VR1 | 24 bit | 2 × 22 kHz | 7 | 320 × 240 | IIx | JPEG I | AudioMedia | Panasonic Opticals | Without |
| VR2 | 24 bit | 2 × 44 kHz | 12 | 320 × 240 | IIx | JPEG I | AudioMedia | 600 MB | Without |
| VR3 | 24 bit | 2 × 48 kHz (one disk) 4 × 48 kHz (sep. disks) | 18 | 640 × 240 | IIx | JPEG I | SA-4 & VSD or Pro I/O | 600 MB | Without |
| VR4 | 24 bit | 2 × 48 kHz (one disk) 4 × 48 kHz (sep. disks) | 23 | 640 × 240 | IIfx | JPEG II | SA-4 & VSD or Pro I/O | 1 GB (600 MB?) | With |

-continued

Hardware Matrix (PRELIMINARY)

| Res. | Depth | Audio | Max K/f | | CPU | JPEG | Audio HW | Disks | Atto | Comments |
|---|---|---|---|---|---|---|---|---|---|---|
| VR5 | 24 bit | 4 × 48 kHz | 40 | 640 × 240 | IIfx | JPEG II | SA-4 & VSD or Pro I/O | 5400 RPM | With | |
| VR21 | 16 bit | 4 × 48 kHz | 20 × 2 | 640 × 240 × 2 | Quadra 900 | JPEG II | SA-4 & VSD or Pro I/O | 5400 RPM | With | Maybe not 4.0 |
| | 24 bit Not for release in 4.0 | | | | | JPEG III | | | | |
| VR6 | | 4 × 48 kHz | 60 | 640 × 240 | Quadra 900 (IIfx?) | JPEG III | SA-4 & VSD or Pro I/O | 5400 RPM | With | Not for 4.0 |
| VR22 | | 4 × 48 kHz | 30 × 2 | 640 × 240 × 2 | Quadra 900 | JPEG III | SA-4 & VSD or Pro I/O | 5400 RPM | With | Not for 4.0 | remaining in the pipeline in the JPEG circuit are the extra black lines. Since part of the JPEG standard includes placing a marker at the beginning of the frame, the length of the compressed frame may be readily determined. Although the extra black lines become part of the compressed image, they are readily removed upon decompression and playback, by removing the last eight lines of each decompressed frame.

Table 1 illustrates the various hardware configurations for achieving different levels of resolution. In the table, JPEG III refers to the configuration shown in FIG. 2b.

Figure 3:
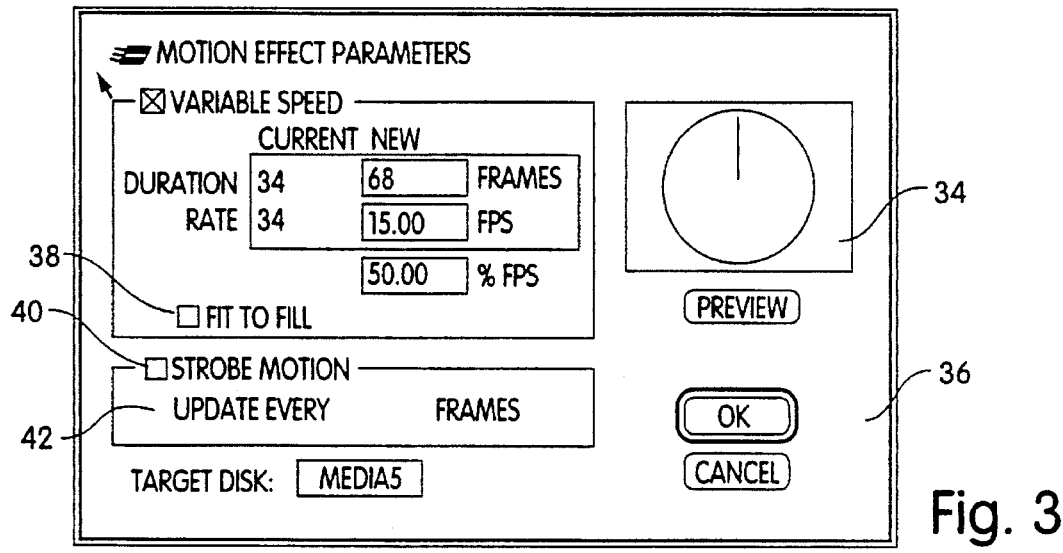
FIG. 3 is a schematic view of the motion effects screen.

The improved media composer of the invention allows the user to pre-visualize motion effects by creating clips and media files which display the requested effect. The new clip can be used like any other chip—it can be trimmed, extracted, overwritten, used in dissolves and wipes, etc.— and its media can be manipulated as any other, that is, it can be deleted, consolidated, and even back digitized. The new motion effect clips are video only. The start time code is zero hour regardless of the time code of the original clip. Motion effects can be created from master clips and subclips, but not from other motion effect clips. There is a delay as the media composer creates new media files. Motion effects are organized into three related features: variable speed, fit-to-fill, and strobe motion. These features are accessed through a single command in a source menu. A Motion Effects command opens a dialog box illustrated in FIG. 3. A preview dial 34 allows the operator to pre-visualize the effect even before the OK function 36 is clicked on. The dial 34 normally rotates at one revolution per second. When the operator enters values for an effect and clicks on PREVIEW, the dial rotates at the new appropriate speed. In this way, the preview dial works as a metronome to give the operator a feel for the pace or rhythm of the effect.

Forward and reverse variable speed effects will now be discussed. First of all, the operator opens a clip in the source monitor 12 and marks an IN and an OUT, and chooses motion effects from the monitor 14 command menu. The operator then enters any one of three parameters: duration, play rate (in fps), or percent speed. When any one of these parameters is entered, the media composer immediately calculates and displays the values for the other two parameters. For example, if one marks a one second piece and enters 50% fps, the media composer will immediately show two seconds as the duration and 15 fps as the play rate of the new clip. One specifies reverse motion by entering a negative rate or percent speed. When the operator clicks on OK, the media composer creates a new clip and video/media file for the appropriate effect and loads this clip into the source monitor 12. It should be noted that when the operator asks for slow motion, the media composer creates a clip in which each frame is duplicated a proportionate number of times. Similarly, when one asks the media composer for fast motion, it creates a clip in which some portion of the source frames have been deleted. When these clips are played, the motion may appear jerky since the media composer is not synthesizing a smoothed series of frames. This effect is especially likely with material transferred from film.

The fit-to-fill option allows one to have the media composer calculate the motion effect required to fill a specific duration in a sequence with a specific duration from the source. The fit-to-fill check box 38 is bold only when the operator has marked an IN and OUT in both monitors 26 and 28 or the four marks are implied by the location of the position control. Given these values for the source (current) and target (new) durations, the media composer calculates the necessary rate in percent speed of the motion effect. One may accept these or enter one's own values. Once the media composer has created a new clip, one can overwrite or splice it into the sequence.

Strobe motion is a type of motion effect in which one frame is held for a specific duration and then the next for the same duration and so on. When one opens a clip in the source monitor, mark an IN and an OUT, and select strobe motion 40 in the motion effects dialog box. The operator must fill in the n in "update every n frames" 42. The new clip will have the same duration as the current one but only every nth frame is displayed. A Remake Effects command recreates dissolve media files and includes all motion effects. As with transition effects it is only possible to recreate motion effect media files when the original source media is online. When the operator batch digitizes a sequence which includes motion effects, the effects are automatically recreated at the end of the process. Motion effects are represented correctly in all supported edit decision list (EDL) formats with the following caveat: It may not be possible to express accurately the media composer motion effect in an EDL because the format may limit the precision with which percent speed can be expressed to whole numbers or one decimal place and the media composer is not likewise limited. In this case, the media composer appropriately truncates the rate or percent speed in the EDL and generates a comment which indicates the true rate or percent speed. With the exception of freeze frames, motion effects are ignored by auto-assembly. Auto-assembly edits video from an original clip at 30 frames per second, starting at the edit inpoint and filling the duration of the effect.

The improved media composer will allow the operator to play four tracks of audio simultaneously instead of only two as in earlier versions. The four tracks are not output through four separate channels, rather only two. The operator hears the tracks through two speakers 16 (FIG. 1) according to the pan setting for each track. In addition, it is not possible to digitize simultaneously four channels of audio. The operator can specify which tracks are candidates to be played by tagging them with speakers on an edit panel. When the operator chooses 1) to play a sequence, 2) to record a digital cut, or 3) to auto assemble a sequence with direct audio, the audio tracks will be output through two channels according to the pan setting for every component on each track. The two output channels can be either analog or digital according to the wiring of an audio interface unit. If the user selects audio from tapes, autoassembly will execute edits for audio channels 3 and/or 4. If the selected EDL format supports four channels, the EDL will include edits for channels 3 and/or 4. The EDL formats which support 4 channels are CMX 3600, Sony 9000 and GVG 4.1. In both the EDL tool and autoassembly, the user can specify which media composer tracks are output as channels 1, 2, 3 and 4. One should note that it is not possible to digitize or output four analog channels of audio simultaneously. However, regardless of the software limitations, it is not possible to output four digital channels of audio because of limitations in the audio interface.

The media composer of the invention will allow the operator to digitize audio at a 48 KHz sample rate. However, it is not possible to use both 48 and 22 KHz or 44 KHz audio in the same sequence. Thus, 48 KHz must be used exclusively when playing a sequence or batch digitizing. When working with the audio interface and video slave driver and 48 KHz audio is selected in the digitized selections dialog box, the media composer automatically adjusts the sample rate on the audio interface. However, one must manually switch the video slave driver from 44 to 48 KHz. Digitizing mixed audio allows one to save space by combining the material in two audio channels into a single media file which is played from both speakers 16. All other audio features, including crossfades, mixdown, and both types of audio scrub, work with 48 KHz audio. The minimum audio hardware required to digitize 48 KHz is a SA-4 card and either the Pro I/O or Pro Tools. This hardware is available from Digidesign of Menlo Park, Calif. The media composer improves 22 KHz audio by automatically increasing the amplitude of low level signals.

Figure 4A:
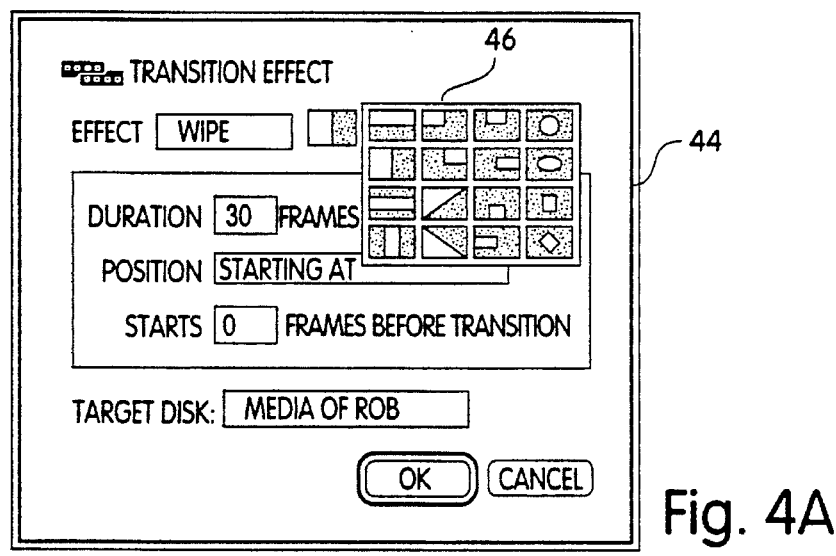
FIGS. 4a and 4b are schematic illustrations of the transition effects screen.
Figure 4B:
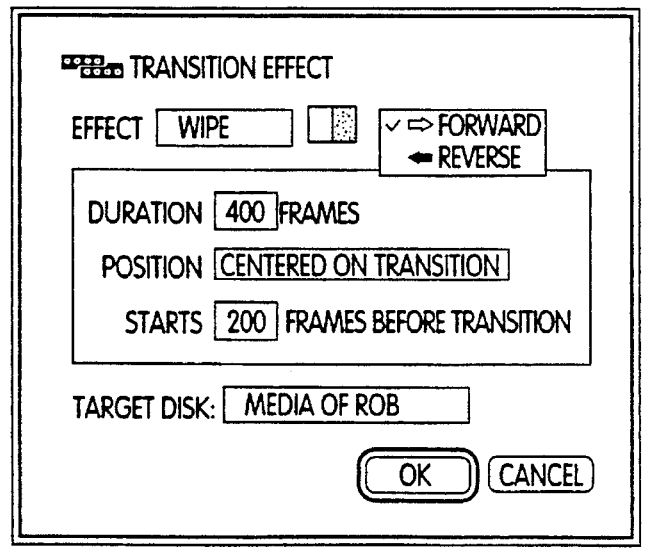

The media composer of the invention offers wipes as a transition effect. Wipes are accessed through a Transition Effect command. This command opens a dialog box 44 (FIG. 4a) which allows the user to choose in a pop-up menu between the two transition effects: dissolve and wipe. When wipe is selected, the operator can choose a pattern from a menu of sixteen choices 46 (displayed graphically) and a direction—forward or reverse as shown in FIG. 4b. Forward means that the outgoing clip is represented by the white in the pattern from the menu 46 and the incoming by the black (actually blue). Reverse means the incoming is represented by the white. Regardless of whether the operator chooses dissolve or wipe, the duration must be entered in frames, its start relative to the transition (starting, centered, ending, or offset) and a target drive for the media files.

The effect can be viewed only after the media composer creates a media file for the specified wipe or dissolve. These effect files will be created, deleted, and recreated in exactly the same way dissolve media files have been in earlier versions. The Remake Effects command includes all transition effects. As with motion effects, it is only possible to recreate transition effect media files when the original source media is online. For example, media for both the incoming and outgoing clip must be online for the media composer to recreate the dissolve between them. When a sequence which includes transition effects is digitized, the effects are automatically recreated at the end of the process. All wipes are expressed correctly in all EDL formats. A dialog box from the EDL Tool allows one to specify the appropriate pattern number for each wipe pattern. The table of numbers and patterns is stored in a file which can be moved from on media composer to another. It is not, however, possible to save and choose among several different sets of values. The present media composer will also allow the operator to zoom to full-screen mode from any monitor (source, record, pop-up) by pressing the quote key. All keyboard equivalents function in full-screen mode. The one exception is that one cannot use Trim Mode while in full-screen play.

The media composer of the present invention allows the operator to enter a mode in which a mouse controller can be used as a shuttle control. Hit L to shuttle forward, Play (the 5 and Back Quote Keys) to shuttle at 30 fps, K (or click a mouse button) to pause (zero speed), J to shuttle backward, and the Space Bar to exit the Shuttle Mode. Hit L twice to shuttle at 60 fps, thrice to shuttle at 90 fps. Hit J twice for −60 and thrice for −90. While shuttling at zero speed, either full-screen or normal, many of the keyboard functions are active. It is possible to step through the program, clear marks, use both kinds of audio scrub (see below), go to the next or previous edit, show safe titles, etc. If the media composer cannot do the function and remain in Shuttle Mode, the mode is dropped and the function performed. Toggling between source and record is an example of such an operation. In one embodiment of the present invention, jog shuttling may be performed, with a result which is similar to that obtained using mechanical jog shuttle controls in connection with video tape recorders. With digitized images being played, a mouse or similar input device can provide control for jog shuttling. Jog mode begins when an operator pressed a button. While the button is depressed, movement of the mouse in one direction or another determines the speed of shuttling, or of playback. That is, the position of the mouse when the button is depressed is used as a reference position. With a relationship defined between position and playing speed, the further the operator moves the mouse from the reference position, the faster video is played back in a given direction. For example, movement of the mouse to the right increases the forward playing speed. If the mouse is returned to the reference position, playing stops. As the mouse is moved to the left, the reverse playing speed increases.

An important aspect of the present media composer is a pitch change audio scrub feature. When the operator shuttles through footage, smooth, continuous audio will be produced at the corresponding speed. That is, pitch will vary with the speed as with an analog tape. This feature is available for one track only. Designate the track for smooth scrub by option clicking (or double clicking) on the speaker icon for that track. The icon becomes an outline. Smooth scrub is available whenever the operator is shuttling, using either the mouse or the shuttle control (beneath the Play button on a keyboard discussed below) to determine the shuttle speed.

When the operator imports a graphic into the media composer and edits it onto the G track of the sequence, it may not be positioned optimally with respect to the underlying video. When the position control is within the graphic element, you can drag the graphic to a more desirable position. Option-drag is for fine control and control-click will move the graphic to its original centered position. During dragging, the media composer displays a special window with information about the graphic's current position relative to the center (its original position) and relative to its position immediately before it was moved. Both of these positions are measured in pixels along the horizontal and vertical axes.

Figure 5A:
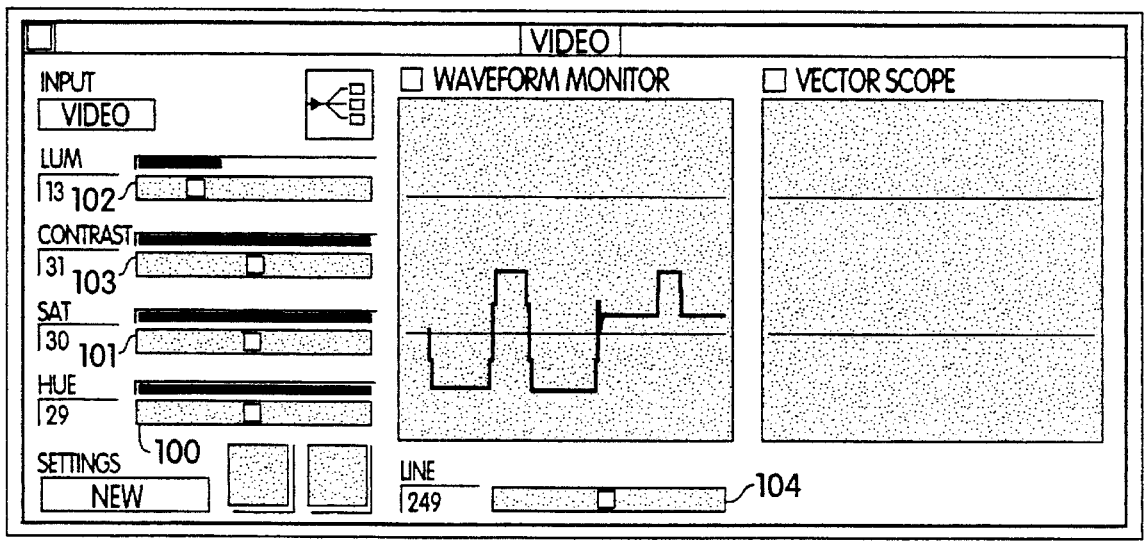
FIGS. 5a and 5b are schematic illustrations of image capture instrumentation.
Figure 5B:
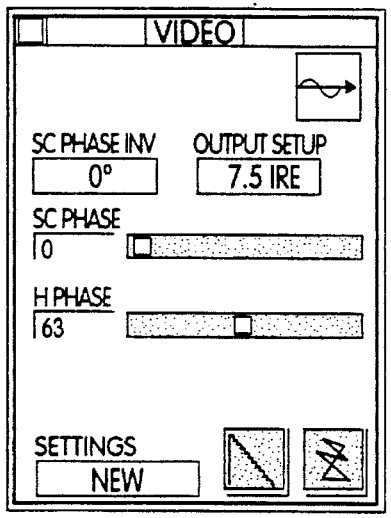

The improved media composer of the invention has been updated to provide image input and output instrumentation in the form of a waveform monitor, a vectorscope and black level controls as shown in FIGS. 5a and 5b. This improved Video Tool allows the operator to save and load settings for contrast, luminance, hue and saturation. Such settings control the video coprocessor 29 and adjust incoming data. The waveform generator and vectorscope are analogous to their analog counterparts which are well known in the art. An operator viewing the waveform generator and vectorscope may use the sliders 100, 101, 102 and 103 to respectively set values for hue, saturation, luminance and contrast. These values control the video processor, in a manner known in the arts which adjusts incoming data accordingly. The line of a frame may be selected for viewing using slider 104. The use of sliders as an interface to allow an operator to set values is well known in the art.

Figure 6:
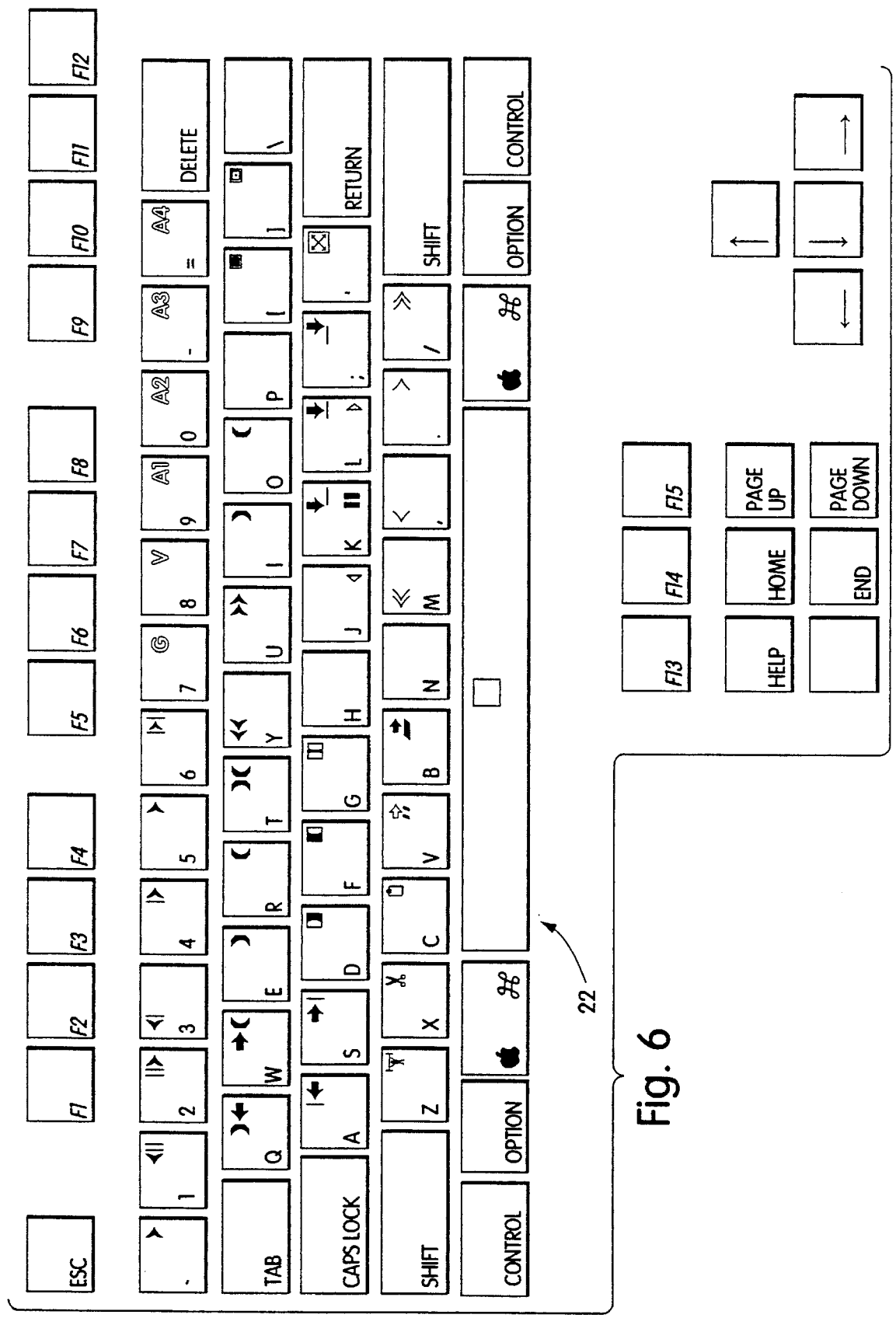
FIG. 6 is an illustration of a keyboard layout.

Keyboard layout is shown in FIG. 6 and the function of the keys is set forth in Table 2. The keyboard 22 is augmented by the mechanical user interface 24. The mechanical user

TABLE 2

Figure 7:
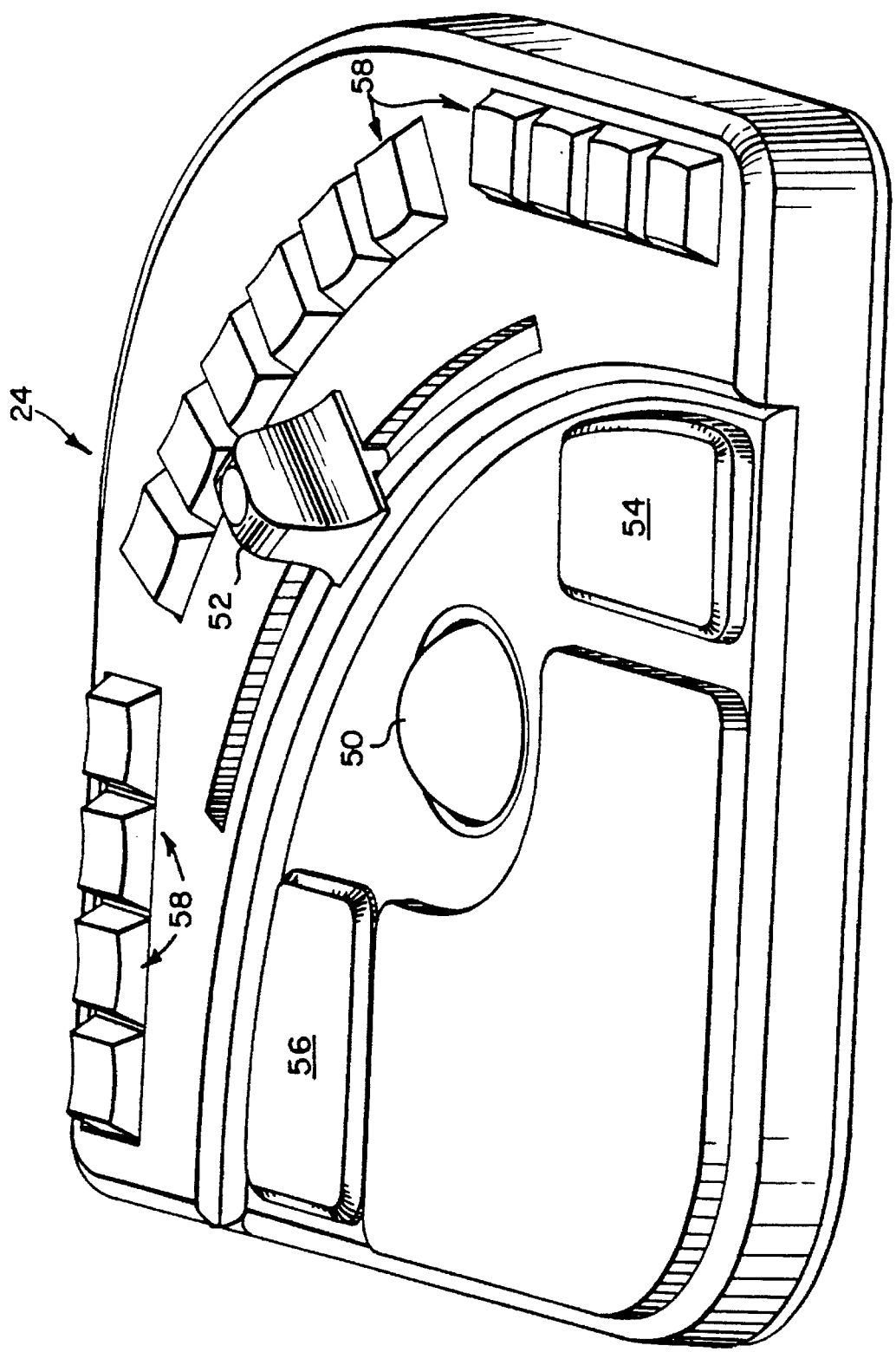
FIG. 7 is a perspective view of the mechanical user interface according to the invention.

| Function | USB (y/n) | Keyboard Equivalent | Notes |
|---|---|---|---|
| 1-Frame Back | | 3 | motion control button |
| 1-Frame Forward | | 4 | motion control button |
| 10-Frame Back | | 1 | motion control button |
| 10-Frame Forward | | 2 | motion control button |
| A1 track on/off | | 9 | track selector |
| A2 track on/off | | 0 | track selector |
| A3 track on/off | | - | track selector |
| A4 track on/off | | = | track selector |
| activate source/record monitor | | ESCAPE | moved from * on numeric keypad |
| All Stop | | SPACE BAR | |
| Clear IN | Y | D | |
| Clear OUT | Y | F | |
| Clear Marks | Y | G | |
| Copy to Clipboard | Y | C | |
| Exit Mouse Shuttle | | SPACE BAR | |
| Extract | Y | X | |
| Fast Forward | | U | deck control function |
| Find Frame | Y | [ | |
| Full Screen on/off | | ' | mode toggle |
| Go to IN | Y | Q | |
| Go to OUT | Y | W | |
| Go to Prev Edit | Y | A | |
| Go to Next Edit | Y | S | |
| Graphics track on/off | | 7 | track selector |
| Lift | Y | Z | |
| Mark Clip | Y | T | |
| Mark IN | Y | E, I | two equivalents for convenience |
| Mark OUT | Y | R, O | two equivalents for convenience |
| Minus 10 Frames | | M | Trim Mode function-trim buttons |
| Minus 1 Frame | | < | Trim Mode function-trim buttons |
| Overwrite | Y | B | |
| Pause | | K | except in Trim Mode; mouse shuttle and deck control function |
| Play | Y | 5 | moved from Tab. The big Play button can be configured as Play IN to OUT or Shuttle Forward |
| Play IN to OUT | Y | 6 | see Play |
| Plus 1 Frame | | > | Trim Mode function-trim buttons |
| Plus 10 Frames | | / | Trim Mode function-trim buttons |
| Rewind | | Y | deck control function |
| Safe Title/Action | Y | ] | |
| Shuttle Back | | J | mouse shuttle and deck control function |
| Shuttle Forward | | L | except in Trim Mode; mouse shuttle and deck, control function |
| Slip Left (1 frame) | Y | < | except in Trim Mode |
| Slip Left (10 frames) | | M | except in Trim Mode |
| Slip Right (1 frame) | Y | > | except in Trim Mode |
| Slip Right (10 frames) | | ? | except in Trim Mode |
| Splice | Y | V | |
| Trim Both | | L | only in Trim Mode |
| Trim Incoming | | ; | only in Trim Mode |
| Trim Outgoing | | K | only in Trim Mode |
| Video track on/off | | 8 | track selector |
| Delete Clip/Sequence (from a bin) | | DELETE | opens delete dialog box from Bin menu | interface 24 is shown in more detail in FIG. 7. The interface 24 includes a track ball 50 and a speed controller 52. As with a mouse, the track ball 50 may be used to locate a cursor on the monitors. Buttons 54 and 56 serve functions like those provided by the click button on a mouse. It is preferred that the speed control 52 have detents for zero speed normal forward speed (30 frames per second) and a reverse normal speed. It is also preferred that the speed control 52 be spring loaded to return to the zero speed position. It is contemplated that additional buttons 58 be provided so that a user may program their functionality.

Yet another aspect of the improved media composer is sync point editing which allows the operator to specify a position in one monitor that is desired to be in sync with the position in the other monitor. The operator then performs an overwrite that preserves that sync relationship. Sync point editing (SPE) is accessed using the SPE command in the media composer menu. Sync point editing is performed in three steps. First, a point is specified in the destination, or record, clip, for example by placing a mouse cursor on the displayed frame of the clip and pressing the mouse button. The location within the clip is then stored. Second, a point in the source material is identified in a similar manner. Third, the size of the source information is specified, for example, by using IN and OUT markers. These steps may, in fact, be performed in any order, which may be defined by the programmer of the computer. After these three steps are completed, the source information is overwritten in the destination, or record, information, by placing the identified source location at the specified destination location. Such sync point editing may be performed with any combination of audio and video clips. Typically, it is performed to synchronize recorded sound to an event in a video clip. The operator may then turn PHANTOM marks on in the media composer window to see how the PHANTOM marks behave in relation to the position control in the record monitor 28. With SPE off, the system uses the current position as the IN; with SPE on, the current position is the sync point. It should be noted that one can mark the IN and OUT in the record monitor 28 instead of the source monitor 26.

Another aspect of the invention is slip-sync editing. This kind of editing typically refers to maintaining synchronization between a series of video clips and corresponding audio clips when transitions between clips are trimmed. In prior art systems, when an audio clip was trimmed, i.e., made shorter, subsequent clips became out of synchronization with their corresponding video clips. In the present system, when audio material is removed from one end of an audio segment from a clip, source material from the original audio clip is added to the other end of the segment so as to maintain the length of the audio segment. The source material can readily be retrieved from the memory location or disk on which it is stored. Thus, the synchronization of subsequent clips is maintained.

Another aspect of the invention allows placement of graphics material interactively on a frame or frames of a video clip. Graphics material may be generated using standard, well-known graphics applications programs, and may be in standard formats, such as PICT format. A data file for graphics material may be accessed and displayed along with a frame from a video clip. Its position may be adjusted by placing, for example, a mouse cursor on the graphics. When an appropriate position has been determined by an operator, the graphics may be made a permanent part of the video clip.

Another aspect of the invention is known as media consolidate. Media consolidate allows a user to select a set of clips in sequences and then copy media data from the media files referred to by that set into new media files on a target disk. A user would typically use this feature when he/she is done or almost done with a project and wants to free up most of his disk space but wants to be able to do more work at some later date without having to redigitize. By consolidating his media to a single disk, the remaining disks can be used for the next project. Of course, if the target disk is removable, all the drives in the media composer can be freed up. It is noted that the source media must be on line for media consolidate to work since it is not going back to the original tapes.

BUFFER AND FRAME INDEXING

Figure 8:
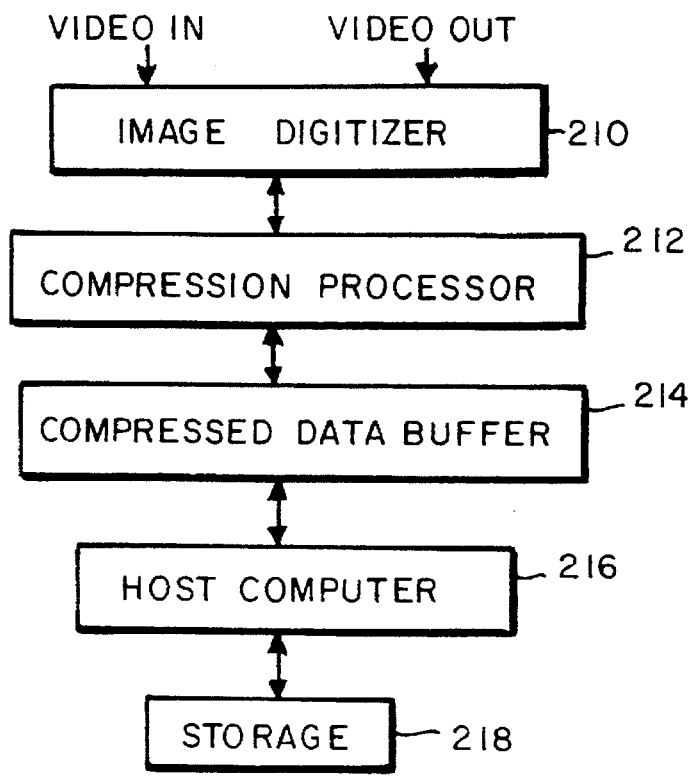
FIG. 8 is a block diagram of a video image capture and playback system implementing data compression.

A block diagram according to a preferred embodiment of a system for capture, compression, storage, decompression, and playback of images is illustrated in FIG. 8.

As shown, an image digitizer (frame grabber) 210, captures and digitizes the images from an analog source, such as videotape. Image digitizer 210 may be, for example, a TrueVision NuVista+ board. However, the NuVista+ board is preferably modified and augmented with a pixel engine as described in "Image Digitizer Including Pixel Engine" by B. Joshua Rosen et al., filed Dec. 13, 1991, to provide better data throughput for a variety of image formats and modes of operation. Other methods of acquiring digitized video frames may be used, e.g., direct capture of digital video in "D-1" or D-2" digital video formats.

A compression processor 212 compresses the data according to a compression algorithm. Preferably, this algorithm is the JPEG algorithm, introduced above. As discussed above, C-Cube produces a compression processor (CL550B) based on the JPEG algorithm that is appropriate for use as the compression processor 212. However, other embodiments are within the scope of the invention. The compression processor 212 may be a processor that implements the new MPEG (Motion Picture Experts Group) algorithm, or a processor that implements any of a variety of other image compression algorithms known to those skilled in the art.

The compressed data from the processor 212 is preferably input to a compressed data buffer 214 which is interfaced to a host computer 216 connected to a disk 218. The compressed data buffer 214 preferably implements a DMA process in order to absorb speed differences between the compression processor 212 and the disk 218, and further to permit data transfer between the processor 212 and the disk 218 with a single pass through a CPU of the host computer 216. (The details of the compressed data buffer 214 according to the present invention will be presented hereinbelow.) The host computer 216 may be, for example, an Apple Macintosh.

Buffer

As discussed above, a compressed data buffer is provided to take up the data rate differences between the disk 218 and the data compression processor 212. In this way, data can be sent directly from the disk to the buffer, or vice versa, passing through the host CPU only once. One thus avoids copying the data from the compression hardware into the host's main memory before it can be written from there to the disk storage subsystem. This scheme cuts the CPU overhead in half, doubling data throughput.

Figure 9:
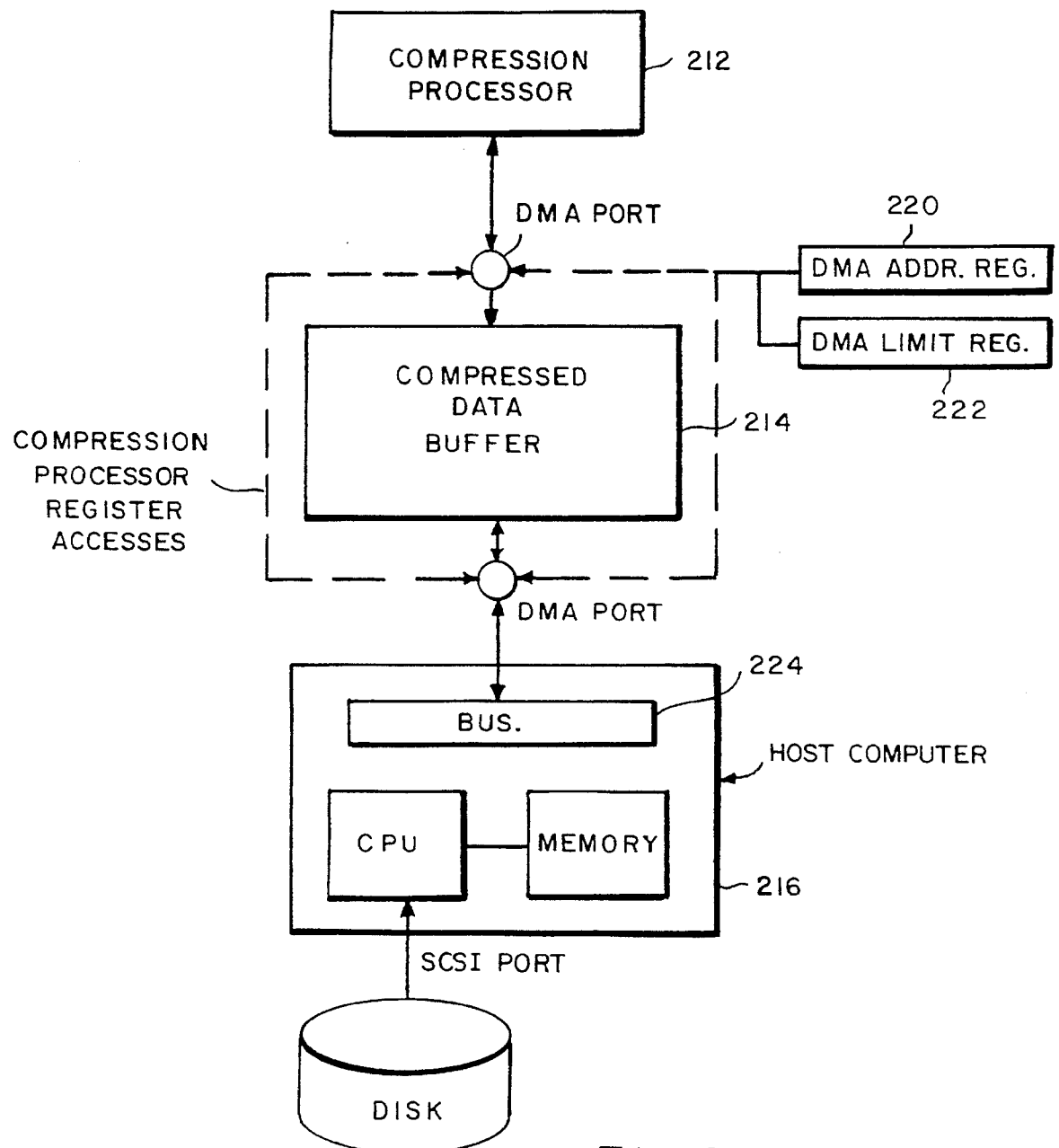
FIG. 9 is a schematic diagram of a compressed data buffer according to one embodiment of the invention.

A detailed schematic diagram of the storage end of the system of FIG. 8 is shown in FIG. 9. The compressed data buffer 214 is addressable. Associated with the buffer 214 are a DMA address register 220 and a DMA limit register 222. These registers and the buffer are seen by a CPU bus 224 of the host computer 216. Because the buffer 214 is addressable, standard file system calls can be used to request that the host computer 216 read data from the disk 218 and send it to the buffer 214, or read data from the buffer 214 and send it to the disk 218. The buffer 214 looks to the computer 216 like an extension of its own memory. No changes to the host computer disk read or write routines are required. For example, a single call to the operating system 216 of the host computer specifying a buffer pointer, a length to read, and a destination of the disk will effect a direct transfer of data from the buffer to the disk. By looking at the DMA address at the JPEG buffer, one can tell when the data is ready. By setting the DMA limit, feedback throttles the JPEG processor filling the buffer.

According to the invention, the buffer 214 is mapped in an address space of the host computer's bus 224 twice. Thus, the buffer is accessible in two contiguous locations. This has important ramifications in an editing environment during playback.

Figure 10:
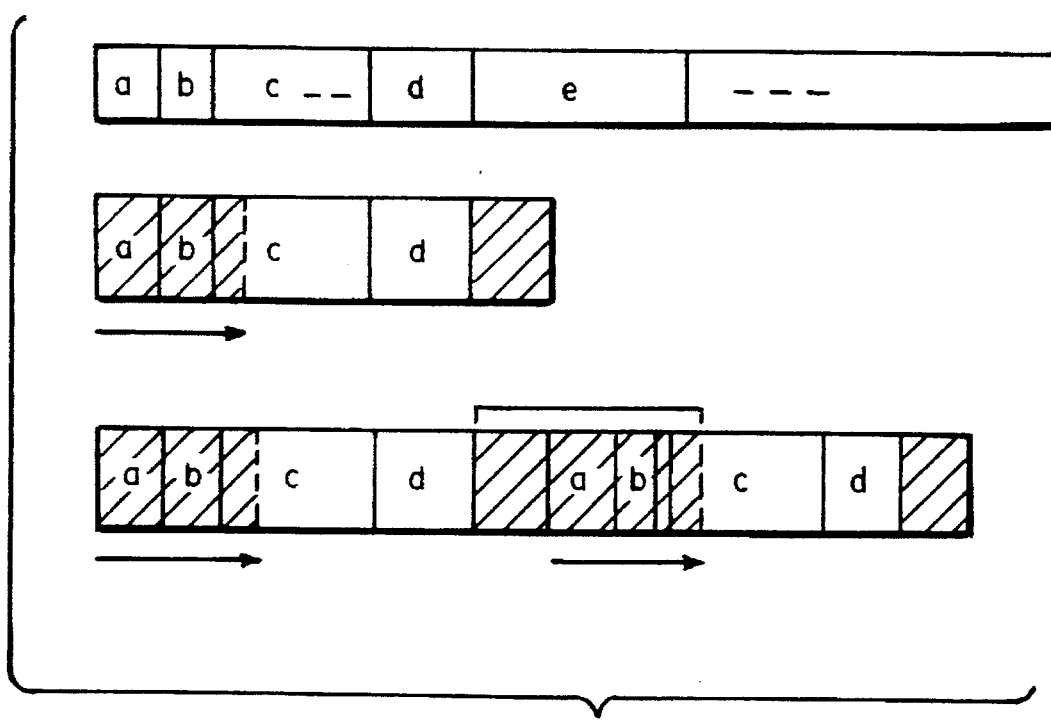
FIG. 10 is a schematic illustration of an edited sequence of images along with two mapping schemes of the compressed data buffer in the host system's bus.

FIG. 10 shows an edited sequence of images and a representation of a buffer that is mapped to the address space of the host computer's bus only once. The sequence is longer than the buffer. Each edit point in the sequence represents a point at which the data must be picked up at a new place on the disk.

During playback, the sequence will be read into the buffer from left to right, and the buffer will empty from left to right as the images are played. In the example illustrated, segments a, b, c and d fit into the buffer. Segment e does not however. For the buffer shown, therefore, two reads will be required to transfer segment e, since part of e win go at the end of the buffer, and the rest will go at the beginning of the buffer, as the beginning empties during playback. It is desirable to limit the number of reads as much as possible, as reads reduce the throughput of the system. The longer the reads, the more efficient the system.

This problem can be largely eliminated by mapping the buffer into the address space of the host computer's bus twice. As illustrated in FIG. 10, segment e now fits in contiguous memory in the buffer by overflowing into the second mapping. In this example, then, the double-mapping has allowed a single read, where two reads would have been required before. In general, for every read, you can read as much as is empty in the buffer. The space in the second mapping is only temporarily borrowed. In practice, the scheme is implemented by making the address of the second mapping the same as the address of the first except for a single bit, and by having the hardware of the system ignore this bit. So whether data is written to the first mapping or the second, it goes to the same place in the buffer.

This double mapping solves an important problem in a way that would not be possible without the buffer, since the computer's memory itself cannot in general be remapped to mimic the technique.

Frame Indexing

For any data compression scheme that results in compressed images with variable frame size, a method of frame indexing is required for finding flames to put together an edited sequence. The location of any frame is preferably instantly available.

The C-Cube chip described above provides a mechanism for creating an index by allowing the user to specify that a marker code be placed at a specified location in every frame. Therefore, a marker code can be placed at the beginning or end of every frame. In prior approaches, a program has been written to sequentially scan the file containing a sequence of images on a disk, and find and remember the location of each marker code. This is a post processing approach and is time consuming.

According to the frame indexing method of the invention, the image digitizer is programmed to generate an interrupt to the CPU of the host computer at every frame.[1] As the compression processor is putting data in the compressed data buffer, each time the CPU detects an interrupt it notes the location of the pointer in the buffer. By keeping track of the number of times the pointer has been through the memory, and the number of bytes the pointer is into the memory at each interrupt, the CPU can keep a table in memory of the position, or more preferably, the length of each frame. This table can be dumped to the disk at the end of the file, thereby providing the location of every frame in the file.

[1] Another prior approach is to use a fast processor or special purpose hardware to recognize and record the position of the marker code on the fly.

The table of frame locations does not solve all problems, however. Retrieving this information as needed during playback of an edited sequence is prohibitively time consuming. The solution is to make only that information necessary for a given edited sequence available to the CPU. The required information is the beginning and end of each segment of the sequence.

According to the invention, a data structure representing an edited sequence is generated at human interaction time during the editing process. Each time a user marks an edit point, an item is added to the list. By including in the list two fields representing the locations of the beginning of first and end of last frames in a segment, this information will be readily available at playback time. Since this prefetching of index values occurs during human interaction time, it does not create a bottleneck in the system.

The CPU can also be alerted whenever the frame sizes are getting too large for the system to handle. Compensating mechanisms can be triggered into action. One example of such a mechanism is the quality adjustment method discussed below. This adjustment reduces frame size (at the expense of quality).

JPEG Encoding and Decoding

Detailed discussions of the JPEG algorithm and its implementation are contained in "The JPEG Still Picture Compression Standard" by G. K. Wallace, in Communications of the ACM, Vol. 34, April 1991, and in "Digital Compression and Coding of Continuous-Tone Still Images, Part 1, Requirements and Guidelines," ISO/IEC JTC 1 Committee Draft 10918-1, February, 1991, both of which are incorporated herein by reference.

Figure 11:
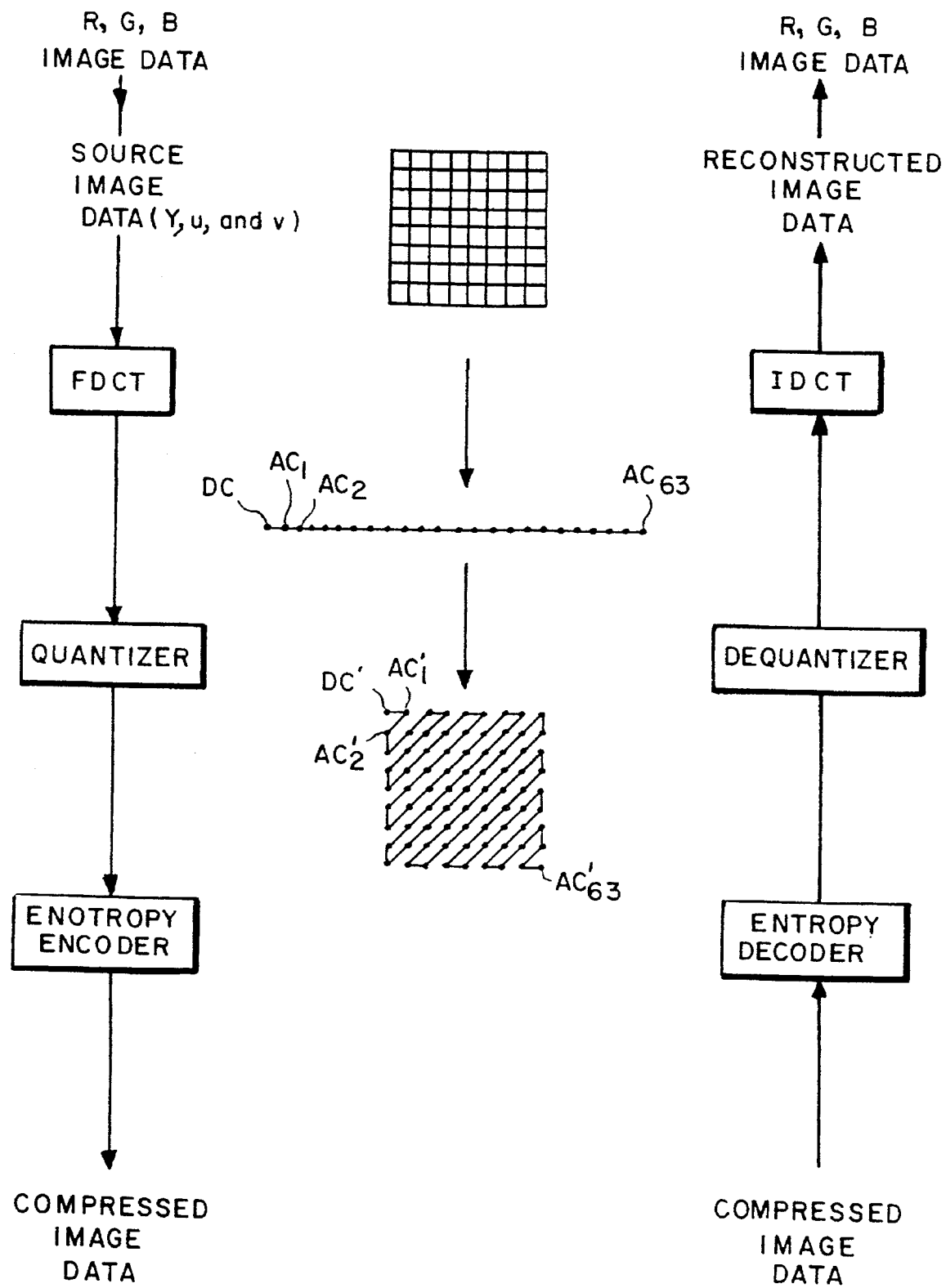
FIG. 11 is a schematic illustration of data compression and decompression according to the JPEG algorithm.

FIG. 11 illustrates the key steps in data compression and decompression according to the JPEG algorithm for a single component of what will generally be a three-component image. In the JPEG standard, an image described in the RGB color space will be transformed into the YUV color space via a 3×3 multiplier prior to compression. This conversion sacrifices some color information, but preserves the more important detail information.

The algorithm works with blocks of 8×8 pixels from the image. Each 8×8 block is input to the compressor, goes through the illustrated steps, and the compressed data is output as a data stream.

The first step in the JPEG algorithm is a Forward Discrete Cosine Transform (FDCT). As described in Wallace, cited above, each 8×8 block of pixels can be thought of as a 64-point discrete signal which is a function of two spatial dimensions. The FDCT computes the "spectrum" of this signal in the form of 64 two-dimensional "spatial frequencies," termed DCT coefficients. The DCT coefficients represent the relative amounts of the two-dimensional spatial frequencies contained in the 64-point discrete signal. The coefficient with zero frequency in both dimensions is called the "DC coefficient" and the remaining 63 coefficients are called the "AC coefficients." Typically each pixel component corresponds to 8 bits, as is the case in 24 bit color. According to the JPEG algorithm, each coefficient is described by greater than 8 bits. In the C-Cube chip discussed above, the number of bits per coefficient is 12. Therefore, at this point, the algorithm has actually led to an expansion, rather than a compression of data. However, since pixel values usually vary slowly across an image, most of the pixel information will be contained in the lower spatial frequencies. For typical 8×8 pixel blocks, most of the spatial frequencies at the high end of the spectrum will have zero or negligible amplitude. Data compression can then be achieved by "throwing out" these coefficients, which is the purpose of the next step.

The next step in the JPEG algorithm is quantization, wherein each of the 64 DCT coefficients is quantized in accordance with a 64-element quantization table. This table is specified by the user. The C-Cube chip allows user adjustability of this table via software inputs to the chip. Each element in the table is any integer from 1 to 255, according to the JPEG standard. Each element is the quantizer step size for a corresponding DCT coefficient. Quantization is achieved by dividing each DCT coefficient by its corresponding quantizer step size, and rounding to the nearest integer, a very lossy process. The elements of the table are chosen so that the generally large lower frequency components are represented by a smaller number of bits, and the negligible higher frequency components become zero. The goal is to represent each DCT coefficient by no more precision than is necessary for a desired image quality. Since the coefficients, therefore, depend on human visual parameters, the table is sometimes called a psycho-visual weighing table.

Compression is achieved by the use of run-length encoding, which puts an end-of-block code at the start of the sequence of zeros that will typically form the end of the 64 coefficient string. The zeros, therefore, don't contribute to the length of the data stream.

After the coefficients have been quantized, they are ordered into a "zig-zag" sequence, as illustrated in FIG. 11. This sequence facilitates the run-length encoding. Before going on to this step, it should be noted, that since the DC coefficient is generally one of the largest coefficients, and furthermore since it is a measure of the average value of the 64 pixels in the 8×8 block, there is generally a strong correlation between the DC coefficients of adjacent blocks, and therefore, the DC component is encoded as the difference from the DC term of the previous block in the compression order.

The final step is entropy coding, wherein additional compression is achieved by encoding the quantized DCT coefficients according to their statistical characteristics. This is a lossless step. As this step is not as relevant to the methods of the present invention as those of the previous steps, the reader is referred to Wallace, cited above for a detailed discussion.

The above steps are essentially reversed, as illustrated in FIG. 1b, during playback. Here too, the reader is referred to Wallace for further details.

Image Quality Adjustment

From the above discussion, it can be seen that image quality can be adjusted by scaling the values of the quantization table. For higher quality images, the elements should be small, since the larger the elements, the greater the loss.

In prior art systems, this is precisely the technique used to adjust image quality during image capture. A variable quality scaling factor (1–255) called the quantization factor or Q-factor is used with JPEG to adjust the degree of quantization of the compressed image. For sequences requiring high quality, low Q-factors are used. For sequences in which quality can be sacrificed, high Q-factors are used. It can be imagined that a user may want to continuously adjust the quality over the range of the Q-factor at the time of capture as scenes change.

The problem with the above method is that if the quantization table values are scaled during image capture, they must be correspondingly descaled during image playback. To illustrate the importance of this, imagine the result if the quantization table element corresponding to the DC coefficient is multiplied by a factor of 10 at some point during image capture in an effort to increase the degree of data compression. If at playback, the original quantization table is used (prior to the upward scaling), the DC coefficient will be 10 times too small. Since the DC component primarily corresponds to brightness, the result is dramatic.

One aspect of the method of the present invention is an alternate method for adjusting quality during image capture which permits playback using a single quantization table. According to this aspect of the invention, the DCT coefficients are filtered during image capture according to the following technique.

As has already been discussed, the DC coefficient is the most important in terms of human perception. The higher the frequency of a coefficient, the finer the detail it describes in an image. Humans are much less sensitive to these high frequency components. Therefore, according to this aspect of the invention, if image quality is to be lowered to further compress the data, the high frequency components are filtered out. The cut-off frequency of the filter determines the degree of compression. This method is in clear contradistinction to the prior method of adjusting the Q-factor.

As described above and illustrated in FIG. 11, the coefficients are sequenced in a zig-zag pattern as part of the quantization step. A filter according to one embodiment of the invention can be characterized as a diagonal line indicating the cutoff frequency. The effect of throwing out the higher frequency components is a blur of the image to an extent determined by the cutoff frequency. This artifact is often acceptable, depending on the scene and the quality required.

Furthermore, the artifact caused by the filtering can be made more tolerable to the eye by adjusting the filter in the following manner. If in addition to throwing out all frequency components above cutoff, the frequency components just below cutoff are muted, the artifact is made less harsh.

The filter described above can be created by hand-creating quantization tables. For all frequencies above cutoff, the table elements should be large, preferably as large as possible without overflowing the arithmetic of the system. For frequencies below cutoff, the table elements can be exactly as used in standard JPEG implementations. However, preferably, the table elements below but near cut-off are increased by some amount to mute the corresponding frequency components as described above. Preferably, this muting is greatest at cutoff, decreasing as the DC coefficient is approached.

The filter can be easily adjusted during image capture to control the degree of data compression by changing the quantization table. In one mode of operation, the filter is user adjusted. However, in another mode of operation, the filter may be automatically adjusted by the system when it senses bottlenecks forming.[2]

[2] The interrupt routine gets activated on each frame. It computes the current frame size and compares it with the desired target size, then it adjusts the table by moving the filter cut-off frequency to approach the target.

As stated above, this aspect of the invention was developed as a method for adjusting quality during image capture in such a way that playback can take place in the absence of the history of such adjustment. It should be clear that this is achieved when the images are played back using the original quantization tables. This is because only the least important coefficients are affected by the filtering. In contrast, in the prior methods for quality adjustment, all coefficients were affected to the same degree.

Subsampling introduces artifacts called aliases to the signal. These frequencies can be predicted and removed by increasing the Q table entries for them.

It will be clear to those skilled in the art that a buffer according to the invention can be simply designed using programmable array logic and memory chips.

What is claimed is:

1. Media editing system for editing source material comprising:

digitizing apparatus for receiving and digitizing video and audio source material, the video source material including a sequence of images, each spanning both the horizontal and vertical display axes of the video source material;

computing apparatus including compression apparatus responsive to the digitizing apparatus, the compression apparatus being for compressing the images from the video source material, wherein the computing apparatus is for determining if at least one of the compressed images occupies more than a target amount of storage and providing an indication if the at least one of the compressed images does occupy more than the target amount of storage, wherein the compression apparatus is responsive to the indication to adjust its level of compression, the computing apparatus further being for manipulating the stored source material;

mass storage responsive to the computing apparatus to receive the compressed video source material and the audio source material; and output apparatus communicating with the computing apparatus for displaying the manipulated source material.

2. The media editing system of claim 1 wherein the compression apparatus is a JPEG compression apparatus and wherein the computing apparatus is for changing quantization tables to use in the JPEG compression apparatus to adjust the level of compression by the JPEG compression apparatus and to obtain a plurality of quantization tables.

3. The media editing system of claim 1 wherein the compression apparatus is a JPEG compression apparatus and wherein the computing apparatus is for compressing and decompressing at least one of the images according to a second of the quantization tables that is a scaling of a first of the quantization tables.

4. A method of editing video source material comprising:

digitizing video and audio source material, the video source material including a sequence of images each spanning both the horizontal and vertical display axes of the video source material, compressing at least a first of the images digitized in the step of digitizing according to a first level of compression, determining whether at least the first image occupies more than a target amount of storage after it is compressed in the step of compressing, continuing to compress the video source material digitized in the step of digitizing according to a second level of compression, in response to a determination that the first image occupies more than the target amount of storage in the step of determining, wherein the second level of compression is different from the first level of compression, and decompressing the video source material compressed in the steps of compressing and continuing to compress.

5. The method of claim 4 wherein the steps of compressing, continuing to compress, and decompressing operate according to the JPEG standard.

6. The method of claim 4 wherein the step of compressing operates according to a first quantization table, and wherein the step of continuing to compress operates according to a second quantization table that is a scaling of the first quantization table.

7. The method of claim 4 wherein the step of determining whether the first image occupies more than a target amount determines whether a frame occupies more than the target amount.

8. The method of claim 4 wherein the step of determining whether the first image occupies more than a target amount determines whether a field occupies more than the target amount.

9. Video processing apparatus for use with a media editing system for manipulating video and audio source material, which system includes mass storage and an output apparatus for displaying the manipulated source material, the video processing apparatus comprising:

an input for receiving digitized video source material, the video source material including a sequence of images, each spanning both the horizontal and vertical display axes of the video source material;

computing apparatus including compression apparatus responsive to the input, the compression apparatus being for compressing the images from the video source material, wherein the computing apparatus is for determining if at least one of the compressed images occupies more than a target amount of storage and providing an indication if the at least one of the compressed images does occupy more than the target amount of storage, wherein the compression apparatus is responsive to the indication to adjust its level of compression; and an output for providing the compressed video source material to the mass storage.

10. The video processing apparatus of claim 9 wherein the compression apparatus is a JPEG compression apparatus and wherein the computing apparatus is for changing quantization tables to use in the JPEG compression apparatus to obtain a plurality of quantization tables and adjust compression by the compression apparatus.

11. The video processing apparatus of claim 9 wherein the compression apparatus is a JPEG compression apparatus and wherein the computing apparatus is for compressing and decompressing at least one of the images according to a second quantization table that is a scaling of a first quantization table.

12. The video processing apparatus of claim 9 further including digitzing apparatus for receiving and digitizing the video and audio source material, the digitizing apparatus having an output for providing the digitized video source material to the input of the compression apparatus.

13. The video processing apparatus of claim 12 wherein the compression apparatus is a JPEG compression apparatus and wherein the computing apparatus is for changing quantization tables to use in the JPEG compression apparatus to obtain a plurality of quantization tables and adjust compression by the compression apparatus.

14. Media editing system for editing source material comprising:

digitizing apparatus for receiving and digitizing video and audio source material, the video source material including a sequence of images, each spanning both the horizontal and vertical display axes of the video source material;

computing apparatus including compression apparatus responsive to the digitizing apparatus, the compression apparatus being for compressing the images from the video source material, wherein the computing apparatus is for determining if at least one of the compressed images occupies more than a target amount of storage and providing an indication if the at least one of the compressed images does occupy more than the target amount of storage, wherein the compression apparatus is responsive to the indication to adjust its level of compression, wherein the computing apparatus is also responsive to the indication to store compression level information regarding each adjustment in the level of compression, the computing apparatus further being for manipulating the stored source material;

mass storage responsive to the computing apparatus to receive the compressed video source material, the audio source material, and the information regarding each adjustment; and output apparatus communicating with the computing apparatus for displaying the manipulated source material.

15. The media editing system of claim 14 wherein the compression apparatus is a JPEG compression apparatus and wherein the computing apparatus is for changing quantization tables to use in the JPEG compression apparatus to adjust the level of compression by the JPEG compression apparatus and to obtain the plurality of quantization tables.

16. The media editing system of claim 14 wherein the computing apparatus is for changing quantization tables to use in the compression apparatus, and wherein the computing apparatus is for compressing and decompressing at least one of the images according to a second of the quantization tables that is a scaling of a first of the quantization tables.

17. A method of editing video source material comprising:

digitizing video and audio source material, the video source material including a sequence of images each spanning both the horizontal and vertical display axes of the video source material, compressing at least a first of the images digitized in the step of digitizing according to a first level of compression, determining whether at least the first image occupies more than a target amount of storage after it is compressed in the step of compressing, continuing to compress the video source material digitized in the step of digitizing according to a second level of compression, in response to a determination that the first image occupies more than the target amount of storage in the step of determining, wherein the second level of compression is different from the first level of compression, and decompressing the video source material, compressed in the steps of compressing and continuing to compress, according to compression level information stored in response to the step of determining.

18. The method of claim 17 wherein the steps of compressing, continuing to compress, and decompressing operate according to the JPEG standard.

19. The method of claim 18 wherein the step of compressing operates according to a first quantization table, and wherein the step of continuing to compress operates according to a second quantization table that is a scaling of the first quantization table.

* * * * *

UNITED STATES PATENT AND TRADEMARK OFFICE
CERTIFICATE OF CORRECTION

PATENT NO. : 5,577,190
DATED : November 19, 1996
INVENTOR(S) : Eric C. Peters

It is certified that error appears in the above-indentified patent and that said Letters Patent is hereby corrected as shown below:

Title page line 14, before "807,117" insert --400,993, which is a continuation of Ser. No.--
Title page line 15, before "807,269" insert --234,713, which is a continuation of Ser. No.--
   Column 1, line 6, before "807,269" insert --234,713, which is a continuation of Ser. No.--
   Column 1, line 8, before "807,117" insert --400,993, which is a continuation of Ser. No.--
   Column 2, line 65, add --buffer.--
   Column 3, line 26, change "m-scaled" to --re-scaled--
   Column 14, line 21, change --D2"-- to --"D-2"--
   Column 15, line 26, change "win" to --will--

Signed and Sealed this

Eighteenth Day of November 1997

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,577,190
DATED : November 19, 1996
INVENTOR(S) : Eric C. Peters

It is certified that error appears in the above-indentified patent and that said Letters Patent is hereby corrected as shown below:

Column 7, line 29, where "chip" should read -- clip --;

Column 10, line 3, where "on" should read -- one --;

Column 14, line 16, after "described in" insert
-- U.S. Patent No. 5,309,528, entitled --;

Column 15, line 56, where "flames" should read -- frames --;

Column 20, line 64, where "digitzing" should read
-- digitizing --.

Signed and Sealed this

Seventh Day of July, 1998

Attest:

BRUCE LEHMAN

*Attesting Officer*  *Commissioner of Patents and Trademarks*